US011049102B2

(12) United States Patent
Rogers et al.

(10) Patent No.: US 11,049,102 B2
(45) Date of Patent: Jun. 29, 2021

(54) DYNAMIC RENDERING OF LOCATION ONE-TIME IDENTIFIERS IN LOCATION-BASED POS APPLICATION

(71) Applicant: IQMetrix Software Development Corporation, Vancouver (CA)

(72) Inventors: Garett Rogers, Vancouver (CA); Laurent May, Vancouver (CA); Ryan Volberg, Vancouver (CA); Phil Brockmeyer, Vancouver (CA); Zoran Kovacevic, Vancouver (CA)

(73) Assignee: IQMetrix Software Development Corporation, Vancouver (CA)

( * ) Notice: Subject to any disclaimer, the term of this patent is extended or adjusted under 35 U.S.C. 154(b) by 0 days.

(21) Appl. No.: 16/847,546

(22) Filed: Apr. 13, 2020

(65) Prior Publication Data
US 2020/0327542 A1 Oct. 15, 2020

(30) Foreign Application Priority Data
Apr. 12, 2019 (CA) .................................. CA 3040037

(51) Int. Cl.
*G06Q 20/38* (2012.01)
*G06Q 20/20* (2012.01)
(Continued)

(52) U.S. Cl.
CPC ......... *G06Q 20/385* (2013.01); *G06Q 20/027* (2013.01); *G06Q 20/202* (2013.01);
(Continued)

(58) Field of Classification Search
CPC .. G06Q 20/385; G06Q 20/027; G06Q 20/202; G06Q 20/3224; G06Q 20/3276
See application file for complete search history.

(56) References Cited

U.S. PATENT DOCUMENTS 6,873,970 B2   3/2005 Showghi
8,175,913 B2   5/2012 Checketts
(Continued)

FOREIGN PATENT DOCUMENTS

WO        2017100865 A1    6/2017

*Primary Examiner* — A. Hunter Wilder
(74) *Attorney, Agent, or Firm* — Michael A. Bondi; Moss & Barnett

(57) ABSTRACT

A method of facilitating the processing of payments in a location-based sales venue such as a restaurant, comprising a plurality of customer locations for service. Each customer location has an identity target device associated therewith and attached in proximity thereto, comprising a network-connected electronic device capable of display or broadcast of a one-time identifier associated with the corresponding customer location to proximate mobile customer devices. On reading of a target by a mobile customer device and a related transmission to the server, the server can associate mobile customer device with its related customer location in the venue-associated POS system, facilitate a payment transaction for the amount owing at the selected customer location through a transaction gateway, and provide a transaction completion indication to the POS system. Following the completion of the payment transaction, the display of the associated identity target device would be updated to remove the expended one-time identifier and a new one-time identifier would be generated and displayed in advance of a new payment transaction in respect of the location. Dynamically generated location one-time identifiers provide maximum flexibility in system configuration, as well as maximized security for users.

33 Claims, 7 Drawing Sheets

(51) Int. Cl.
  *G06Q 20/02* (2012.01)
  *G06Q 20/32* (2012.01)
  *G06K 7/14* (2006.01)
(52) U.S. Cl.
  CPC ..... *G06Q 20/3224* (2013.01); *G06Q 20/3276* (2013.01); *G06K 7/1417* (2013.01)

(56) References Cited

U.S. PATENT DOCUMENTS

| | | |
|---|---|---|
| 8,447,067 B2 | 5/2013 | Rhoads |
| 9,373,091 B1* | 6/2016 | Belser ................... G06Q 20/00 |
| 9,659,102 B1 | 5/2017 | Cronin |
| 9,733,271 B2 | 8/2017 | Hosein |
| 9,870,585 B2 | 1/2018 | Cronin |
| 2011/0093302 A1 | 4/2011 | Hernandez |
| 2013/0054413 A1* | 2/2013 | Brendell ............ G06Q 20/3276 705/26.41 |
| 2013/0138518 A1* | 5/2013 | White .................. G06Q 20/325 705/16 |
| 2014/0279098 A1* | 9/2014 | Ham ................... G06Q 20/102 705/16 |
| 2015/0356664 A1 | 12/2015 | Mackler |
| 2016/0189287 A1 | 6/2016 | Van Meter |
| 2017/0357959 A1 | 12/2017 | Checketts |
| 2018/0047092 A1 | 2/2018 | Hennessy |

* cited by examiner

| 1-1 | 1-2 | 1-3 |
|-----|-----|-----|
| 1-4 | 1-5 | 1-6 |

| 2-1 | 2-2 |
|-----|-----|
| 2-3 | 2-4 |

DYNAMIC RENDERING OF LOCATION ONE-TIME IDENTIFIERS IN LOCATION-BASED POS APPLICATION

FIELD OF THE INVENTION

This invention is in the field of POS systems and methods for use in location-based sales venues such as restaurants and the like, and more specifically deals with a method of facilitating customer payments using identity target devices related to customer locations within the venues to display one-time identifiers readable by mobile devices to initiate payment transactions.

BACKGROUND

Continued evolution across many service industries requires the application of computer technologies to customer facing services to offer enhanced and customized services with optimized efficiency to customers. Particularly in service establishments where it is desired to provide an element of self-service and enhanced checkout speed, which will please customers and result in an increased turnover of customer locations to potentially enhance profitability of the business, the ability to provide for enhanced velocity in payment transactions would be appreciated both by customers and the venues in which they are making purchases.

Most location-based sales venues rely upon POS systems that map customer purchases against individual customer locations within the venue i.e. individual seats, tables and the like. Transaction of service to these locations typically involves two steps—the customer places an order with an employee who transposes an order into the POS system ordering the desired items from the preparation area or warehouse for delivery to a particular customer location, and when the customer wishes to pay their bill the bill is called up in the POS system at a checkout counter or the like in relation to the customer location and payment is processed.

The widespread availability of mobile customer devices, such as smart phones and the like, on the person of virtually any quick service consumer has further enhanced the desire for development and delivery of transaction and payment methods that incorporate the use of those devices, and with the comfort level with those devices of users are generally speaking widely accepted.

Some prior art methods of self-service payment and ordering by the customer rely upon human data entry of a seating location into an app or a website available on a user device. This typically involves either transposing the seating location within the venue that is printed on a label affixed near the chair in the establishment, or on the paper bill that is provided by the waitperson. However, the need for transposition of numerical seating locations or the like by data entry by the user on their user device can result in errors. If it were possible to provide a means of facilitating rapid self-service check out or payment in location-based sales venues such as restaurants, bars or the like, which did not rely upon human data entry to properly enter and select the bill to be paid within the establishment, it is felt that this would be preferred in industry and would be more widely accepted by users.

Other previous attempts have been made to streamline self-checkout capabilities in restaurants and the like by placement of a static machine-readable label at individual customer locations within the location-based sales venues. For example each table in a restaurant, or each seat at a table in a restaurant, has a label attached which can be scanned by a typical QR code scanner or the like on the smart phone of the user, which machine-readable code includes an indication specifically of the seating location within the venues which can be directly matched back to the seating location in the restaurant POS system. For example, see U.S. Pat. No. 9,117,231 to Qikserve Ltd., entitled "Ordering System and Method for Restaurants". Systems such as the Qikserve system outlined above however are not rapidly scalable or easily maintained insofar as they require the printing of customized labels for use at each seating or customer location within a location-based sales venue—for example, where each seat has a label attached corresponding thereto, following detailed layout planning of the venue labels need to be individually printed corresponding to each particular location, and if a label is ruined in installation or in prolonged use, individual customized labels need to be reprinted for attachment in their place.

One alternative to printed labels affixed in proximity to individual seating locations are the use of readable beacons or electronic displays, which can electronically broadcast or display an one-time identifier corresponding to the seating location and/or venue, for the purpose of initiating an ordering or payment transaction in conjunction with a restaurant POS system. Displaying a one-time identifier that includes indication of the seating location and/or venue, or includes a static one-time identifier that can be linked back to a central database to identify the venue and location, are two such approaches that could be attempted.

It is envisioned that in certain cases it may be most desirable to use an electronic display or broadcast/beacon method to make deployment, maintenance and use of the system both for the venue and customers as quickly as possible, but to allow for a one-time use one-time identifier to maximize flexibility or security of the method. If a method of identifying customer locations within venues in such transaction methods was possible that incorporated a one-time identifier for the targets/displays, it is believed this would be desirable and widely accepted in many areas. A dynamic one-time identifier display would remove the need to specifically assign static one-time identifiers to individual customer locations, which would simplify deployment in complicated or pre-existing areas, and if a dynamic one-time identifier display were used in which he one-time identifiers could either from transaction to transaction or periodically be changed or regenerated that would provide further security to the venue and to previous customers.

SUMMARY OF THE INVENTION

One aspect of the present invention relates to a method of processing payments in at least one location-based sales venue, such as a restaurant or other hospitality establishment or the like, which comprises a plurality of customer locations in respect of which charges for products or services would be tracked and collected.

The location-based sales venue would include a network-connected venue-associated POS system, as well as a network-connected identity target device associated with and attached in proximity to each customer location and capable of dynamically displaying a one-time identifier readable by mobile customer devices. A server includes a payment processing software component, a network interface capable of communication via at least one data network with mobile customer devices as well as with the venue-associated POS system of each served sales venue and the network-connected identity target devices in respect of each customer location in the sales venues in question. The server also comprises a transaction gateway, either internally or by external connection, through which customer payments can be processed, and a location database.

The location database includes a venue record for each sales venue served in accordance with the method of the present invention. The venue record includes venue payment coordinates by which payments to the venue can be electronically processed by the transaction gateway, and network address details for the venue-associated POS system, by which the server can communicate with same. The location database would also include a location record corresponding to each physical customer location within each venue, which would contain venue specific location details corresponding to a customer location defined within the venue-associated POS system, the network address details for the associated identity target device, and details of a single use one-time identifier associated with the related customer location and capable of being displayed by the associated identity target device.

The method includes in monitoring step in which the server uses the payment processing software component to monitor any posting in venue-associated POS systems in respect of customer locations within associated venues, and upon detection of the posting of any chargeable amounts in respect of a customer location, which is then an active location, the server and the payment processing software component generates and stores a single use one-time identifier to location record corresponding to the active location, and transmits that generated single use one-time identifier to the identity target device associated with the active location via a network interface 19 between the server and those devices. Effectively, the server will generate a one-time identifier, transmitted to the identity target device corresponding to the customer location over the network, which device will in turn display or transmit that one-time identifier for machine reading by mobile customer devices to customers at the time that a payment transaction is desired to be initiated.

Any time that an identity target device receives a transmission of a new one-time identifier from the server via the network, that identity target device in conjunction with whatever onboard software and electronics it contains will display the new one-time identifier in a way that can be read by a mobile customer device. This transmission and display of the one-time identifier is referred to as the target rendering step of the method.

When a customer wishes to facilitate a transaction payment in respect of all POS charges related to one or more customer locations they can initiate a transaction payment in accordance with the remainder of the method. The payment processing step would be conducted by the server of the payment processing software component, palm initiation by a customer in a mobile customer device, by first receiving at the server and location transmission from the mobile customer device of a user. The location transmission would comprise a data packet that contained data corresponding to the readable one-time identifier displayed by identity target device in respect of each active customer location in respect of which payment was desired to be processed. Each active customer location in respect of which payment was desired to be processed is also referred to as a payment location. The location transmission data packet would also include data corresponding to customer payment method details of the customer, whether those were securely transmitted or encrypted credit card payment details, credentials or data required to facilitate a tunneled payment transaction, or the like.

Upon receipt of a location transmission from a mobile customer device, the payment processing software component would parse that transmission is received to extract the one-time identifiers associated with each of the payment locations and the customer payment method details.

Following extraction of the relevant data contained within the location transmission is received at the server by the network interface 19, from a mobile customer device of the user wishing to transact a payment, the payment processing software component would select the location records corresponding to each payment location from the location database, by matching the one-time identifiers extracted from the location transmission with the one-time identifiers stored in individual location records in the location database. Payment could then be totaled and transacted by first conducting a query of the venue-associated POS system for amounts payable in respect of each payment location. This could be looked up by virtue of the fact that each location record in the location database would contain the necessary cross reference information for the customer location in question to the related records in the on-site POS system.

The payment processing software communication, in communication with the venue-associated POS system via the network interface 19 of both systems, would conduct a query of the venue-associated POS system for amounts payable in respect of each identified payment location and then calculate the total payment amount required from the customer in respect of all the payment locations. In some cases it may be desired by a customer to simply pay for charges in respect of a single customer location—for example a single table or even a single seat at a table within a restaurant or hospitality site for example—were in other cases it may be desired by the customer to pay the charges in respect of multiple customer locations in which case the one-time identifiers for the multiple payment locations would be included within the location transmission and would be all looked up for totaling within the aggregation query to identify the transaction tool required for payment both such approaches are contemplated within the scope of the present invention.

The payment processing software component would next trigger a payment transaction for the identified total payment amount using the transaction gateway of the server, using the customer payment method details received from the mobile customer device, and the venue payment coordinates from the venue record in the location database that is associated with the payment locations. As outlined elsewhere herein, the transaction gateway itself could be integrated within the server, or could be an external or third party service that was in turn also connected appropriately via software and a network interface 19 to the server. Both such approaches are contemplated within the scope of the present invention again.

On completion of the payment transaction, the server would transmit a payment completion indication to the venue-associated POS system in respect of the payment locations that would allow the POS system to clear those locations for service of new customers or additional charges. The payment processing software component on the server would also update the location record for each payment location within the transaction conducted, by removing the stored single use one-time identifier from those records such that new one-time identifiers could be calculated the next time that new POS charges in respect of those locations were detected.

The one-time identifiers which would be generated and used in the system of the present invention would not correspond specifically to physical location details of the corresponding customer locations in the venues insofar as it is intended that they would be one-time and not reused between transactions. They would also not be duplicated on any two location records, either within the same sales venue or others. The one-time identifiers which were used in respect of location records and payment locations in a particular payment transaction are specifically contemplated to not be reused in subsequent payment transactions by the server. Detaching the nature of the one-time identifiers from the identifying details of the customer locations, and rendering them one-time on a transaction by transaction basis, makes the system as venue agnostic as possible for installation and configuration and as secure as possible both from the perspective of the venue as well as the customers insofar as the ability to reuse a one-time location one-time identifier in a subsequent payment transaction would be eliminated, maximizing security of the system.

The system of the present invention relies upon the identity target devices associated with each customer location to be capable of displaying or transmitting a machine-readable data stream corresponding to the one-time identifier at the relevant time in the corresponding location record in the location database. The system wide one-time identifier which would be displayed by these identity target devices regarding the customer location would not necessarily be readable by a human and would only be machine-readable—in the case of a visible display the nature of the display might be a barcode, a QR code or the like. Any type of a hardware device which was network-connected and capable of dynamically displaying a machine-readable visible code or data token will be understood to be within the scope of the present invention.

A second type of identity target device which could be used would be a short range radio beacon, such as a NFC or RFID beacon or tag, which would be readable by a reader within the customer mobile device. In such a case the identity target device broadcasts the one-time identifier associated with the customer location and is readable by radio rather than by vision or scanning with the camera or the like of the customer mobile device. Use of beacons, which are understood by those skilled in the art, would allow for concealed installation of the identity target devices and might be desired in a permanent or upscale installation where it was desired to not place many targets regarding customer locations on the tables or other services related to the customer locations within the venue.

Insofar as the system wide one-time identifier used regarding each customer location and stored in the corresponding location record would not correspond directly to the venue or the location i.e. it would effectively comprise a system wide serial number, random token or the like, there are no significant custom printing or customization requirements. The one-time identifier used on each transaction on each identity target device would be different system wide i.e. it would not match the one-time identifier used on any other identity target device on any other customer location in any venue connected to the system. Using generic system wide serial one-time identifiers not customized and not specifically corresponding to the venue or the customer location within the venue represents a significant and patentable improvement over the state-of-the-art.

As outlined above and elsewhere herein, it is explicitly contemplated that payment transactions could be initiated in accordance with the method of the present invention by a customer regarding one or more than one selected customer locations within a location-based sales venue. Individual customers at a table of multiple customers could pay for the bill associated with their particular seating location on the venue-associated POS system, or in other cases where it was desired to pay the bill regarding the entire table the customer initiating the payment could use their mobile customer device to read the identity target device of each seat at the table.

It may also be the case in certain circumstances, again using the example of a restaurant, that a single identity target device could be provided which would allow for practice of the method of the present invention regarding multiple customer locations at one time—for example, a table in a restaurant might include an identity target device regarding each chair at the table, and there might be another target provided which had a separate one-time identifier expressed thereon which was programmed on the back end to correspond to the seats at the table, so that if someone wished to generate a transaction regarding all the seats at the table they could scan the one table target rather than scanning all of the seat targets at the table. The necessary modifications to the system of the present invention to allow to include this additional layer of customization will be obvious to those skilled in the art and are contemplated within the scope hereof as well.

Some location-based sales venues might include more than one POS system, with certain customer locations within the venue allocated to one POS system and others to another. It is expressly contemplated and encompassed by the claims outlined that the system could accommodate location-based sales venues including more than one venue-associated POS system, by having the information for network communication between the server and any necessary venue-associated POS systems stored in the venue record of the location database, and storing also in the location database likely in the location record corresponding to each customer location information related to the particular POS system to which a particular location is assigned.

As also outlined above it is explicitly contemplated the system and method of the present invention could be practiced in many venues using a single server and backend system. The method of the present invention could either be used in one venue, with a single server, network connection and the like, or in a multiple venue scenario, multiple venues of even multiple proprietors could use the same system with the appropriate authentication and security and communication channels established between the venue-associated POS systems and the server. Again any necessary modifications to the system and method of the present invention to accommodate the use in one or more venues of one or more vendors will be understood to those skilled in the art and are all contemplated within the scope of the present invention.

The identity target device at a customer location in a venue using the system of the present invention could be read by the customer mobile device using pre-existing software on the customer mobile device, such as a scanner and browser combination, or a specific client app could also be developed and installed on customer mobile devices to facilitate participation in the method of the present invention. Both such approaches are contemplated within the scope of the present invention. Whether pre-existing software or and installed proprietary client app were used, reading the one-time identifier from an identity target device regarding a customer location in a venue would cause the initiation of a location transmission to the server and an ordering transaction.

Once the payment transaction or a particular order is processed, the necessary information to provide POS system reconciliation and/or vendor information to allow the venues to reconcile their funding and orders can all be captured, reported and communicated.

In some implementations of the method, the server may be a web server. In some implementations of the method, the one-time identifier contains a web link and the pre-existing software includes a reader capable of parsing the one-time identifier to extract or look up the web link or other one-time identifier matter. In some implementations of the method, the pre-existing software also may include a web browser that will open the parsed web link to initiate the location transmission and subsequent payment interaction between the customer and the server.

The server could include the transaction gateway software or hardware to process payment transactions directly, or in other embodiments of the server in the method of the present invention, a transaction gateway might be integrated with the server that was externally located, via an appropriate network connection.

The monitoring step, where the server would identify the posting of charge eligible transactions in respect of customer locations in the sales venue could be conducted in at least a couple of ways—the venue-associated POS system could transmit the details of posted charge eligible transactions to the server, or transmit at least an indication of the posting of such transactions even if the details were not provided, for the purpose of initiating the rendering of an up-to-date one-time target at the sales location or locations in question, or alternatively the server could periodically poll all of the venue-associated POS systems associated there with, using the network addresses of those systems contained within the venue records in the database, and identify newly posted transactions or activated sales locations within those venues. Both such approaches as well as any others obvious to those skilled in the art will be understood to be within the scope of the present invention as intended.

Similarly, the identity target devices with their associated operating software could comprise a network listener which would receive transmissions of generated one-time identifiers to initiate the target rendering step in respect of a particular customer location when it becomes an active location, or in other cases, the identity target devices could each periodically poll there related location records in the location database to identify any change in the active status of the related customer location. Again, both such approaches are contemplated within the scope of the present invention.

It is specifically contemplated that the identity target devices used in respect of each customer location in the sales venue-associated with the method of the present invention could comprise an e-paper device, mobile computer device of the video display, or a freestanding smart video display or tablet or the like, each of which had the necessary controller and software thereon to enable network communication with the server and the location database, along with having the necessary components to provide a machine-readable visual display of the one-time identifiers corresponding to the associated customer locations. Where an identity target device had a larger physical display, it is specifically contemplated that a single identity target device could be associated with the plurality of customer locations and provide the necessary marking on the display to assist customer in properly scanning or capturing the details of the relevant one-time identifier or one-time identifiers for locations in respect of which they wish to initiate a payment. Unlike other systems and methods that use a static and physically attached one-time identifier, the use of a dynamic display on a device permits the rotation or novation of the one-time identifiers for each location as required and enhances the security of the method of the present invention.

In other embodiments, the identity target devices could comprise short-range radio beacons with the necessary controller and software thereon to enable network communication with the server along with machine-readable transmission of data corresponding to one-time identifiers of the associated customer locations to approximate mobile customer device. For example, an NFC or RFID transmitter or the like. There are many different types of beacons that will be understood, all of which again are contemplated within the scope of the present invention.

As outlined above, the mobile customer device might have pre-existing software capable of reading the identity target device in relation to a particular customer location, or in other cases the mobile customer device might contain a locally installed application for communication with the server and facilitation of the method. In the case of pre-existing software, such as a browser, the server might be a Web server, and the one-time identifier which is transmitted or displayed by the identity target devices might comprise a web link embedded within the one time one-time identifier which when parsed and opened by the software on the mobile customer device would result in the initiation of a location transmission session with the Web server. In such embodiments, the location transmission session when initiated could permit for additional interaction allowing for tipping or financial adjustments or verification of the transactions in question, as well as allowing for the provision of additional security credentials etc. as might be required to facilitate for example particular types of customer payment methods which might be embedded upon the customers mobile device.

In addition to the overall method of the present invention as outlined above, another embodiment of the invention comprises a system for the processing of payments for at least one location-based sales venue containing a plurality of customer locations and having a network-connected venue-associated POS system. The system could be used in association with sales venues with pre-existing POS architecture in place.

In varying embodiments, the system comprises two key groups of components, the first of which is a series of network connected identity target devices, as well as a server. The system would comprise a network-connected identity target device capable of dynamically displaying a one-time identifier readable by mobile customer devices associated and attached in proximity to each customer location.

A key hardware component used in the practice of the method of the present invention and this embodiment is a server which includes a payment processing software component, a network interface 19 capable of communication via at least one data network with mobile customer devices as well as with the venue-associated POS system of each served sales venue and the network-connected identity target devices in respect of each customer location in the sales venues in question did the server also comprises a transaction gateway, either internally or by external connection, through which customer payments can be processed, and a location database.

The location database includes a venue record for each sales venue served in accordance with the method of the present invention. The venue record includes venue payment coordinates by which payments to the venue can be electronically processed by the transaction gateway, and network address details for the venue-associated POS system, by which the server can communicate with same. The location database would also include a location record corresponding to each physical customer location within each venue, which would contain venue specific location details corresponding to a customer location defined within the venue-associated POS system, the network address details for the associated identity target device, and details of a single use one-time identifier associated with the related customer location and capable of being displayed by the associated identity target device.

The system would work in conjunction with the venue having a pre-existing venue-associated POS system in place, or could be installed along with a related venue-associated POS system where a retrofit was not required. Both such approaches are contemplated within the scope of the present invention.

The system would facilitate the payment processing method of the present invention which includes a monitoring step in which the server uses the payment processing software component to monitor any posting in venue-associated POS systems in respect of customer locations within associated venues, and upon detection of the posting of any chargeable amounts in respect of a customer location, which is then an active location, the server and the payment processing software component generates and stores a single use one-time identifier to location record corresponding to the active location, and transmits that generated single use one-time identifier to the identity target device associated with the active location via a network interface 19 between the server and those devices. Effectively, the server will generate a one-time identifier, transmitted to the identity target device corresponding to the customer location over the network, which device will in turn display or transmit that one-time identifier for machine reading by mobile customer devices to customers at the time that a payment transaction is desired to be initiated. Any time that an identity target device receives a transmission of a new one-time identifier from the server via the network, that identity target device in conjunction with whatever onboard software and electronics it contains will display the new one-time identifier in a way that can be read by a mobile customer device. This transmission and display of the one-time identifier is referred to as the target rendering step of the method.

When a customer wishes to facilitate a transaction payment in respect of all POS charges related to one or more customer locations they can initiate a transaction payment in accordance with the remainder of the method. The payment processing step would be conducted by the server of the payment processing software component, palm initiation by a customer in a mobile customer device, by first receiving at the server and location transmission from the mobile customer device of a user. The location transmission would comprise a data packet that contained data corresponding to the readable one-time identifier displayed by identity target device in respect of each active customer location in respect of which payment was desired to be processed. Each active customer location in respect of which payment was desired to be processed is also referred to as a payment location. The location transmission data packet would also include data corresponding to customer payment method details of the customer, whether those were securely transmitted or encrypted credit card payment details, credentials or data required to facilitate a tunneled payment transaction, or the like. Upon receipt of a location transmission from a mobile customer device, the payment processing software component would parse that transmission as received to extract the one-time identifiers associated with each of the payment locations and the customer payment method details.

Following extraction of the relevant data contained within the location transmission is received at the server by the network interface 19, from a mobile customer device of the user wishing to transact a payment, the payment processing software component would select the location records corresponding to each payment location from the location database, by matching the one-time identifiers extracted from the location transmission with the one-time identifiers stored in individual location records in the location database. Payment could then be totaled and transacted by first conducting a query of the venue-associated POS system for amounts payable in respect of each payment location. This could be looked up by virtue of the fact that each location record in the location database would contain the necessary cross reference information for the customer location in question to the related records in the on-site POS system.

The payment processing software, in communication with the venue-associated POS system via the network interface 19 of both systems, would conduct a query of the venue-associated POS system for amounts payable in respect of each identified payment location and then calculate the total payment amount required from the customer in respect of all the payment locations. In some cases it may be desired by a customer to simply pay for charges in respect of a single customer location—for example a single table or even a single seat at a table within a restaurant or hospitality site for example—were in other cases it may be desired by the customer to pay the charges in respect of multiple customer locations in which case the one-time identifiers for the multiple payment locations would be included within the location transmission and would be all looked up for totaling within the aggregation query to identify the transaction tool required for payment both such approaches are contemplated within the scope of the present invention. The payment processing software component would next trigger a payment transaction for the identified total payment amount using the transaction gateway of the server, using the customer payment method details received from the mobile customer device, and the venue payment coordinates from the venue record in the location database that is associated with the payment locations. As outlined elsewhere herein, the transaction gateway itself could be integrated within the server, or could be an external or third party service that was in turn also connected appropriately via software and a network interface to the server. Both such approaches are contemplated within the scope of the present invention again.

On completion of the payment transaction, the server would transmit a payment completion indication to the venue-associated POS system in respect of the payment locations that would allow the POS system to clear those locations for service of new customers or additional charges. The payment processing software component on the server would also update the location record for each payment location within the transaction conducted, by removing the stored single use one-time identifier from those records such that new one-time identifiers could be calculated the next time that new POS charges in respect of those locations were detected. Variations on the transaction processing method of the present invention will be understood to those skilled in the art and such variations as do not depart from the overall scope and intention expressed herein, namely the use of a dynamic adjustable identity target device in respect of individual customer locations in location-based sales venues to permit the rapid facilitation of sales transactions, are all contemplated within the scope of the present invention. The various embodiments of the system outlined and contemplated what facilitate the method of the present invention as outlined.

The identity target devices in a particular sales venue could be directly connected to the wide area network to which the server, the POS system and other components were connected, or in other embodiments which are explicitly contemplated to be within the scope of the present invention, the identity target devices could be connected to a local network using a separate hub or aggregation device which was in turn connected to the main network communication with the server—for example the identity target devices could comprise their own local low powered mesh network or the like, or other types of network topologies as will be understood to those skilled in the art of network and hardware and software design will all be understood to be within the scope of the present invention.

Another embodiment in respect of the present disclosure relates to a server configured for the processing of payments for at least one location-based sales venue containing a plurality of customer locations and at least one network connected venue-associated POS system, wherein each customer location has an identity target device attached in proximity thereto capable of displaying a machine readable one-time identifier obtained from the server, he in respect of the corresponding customer location. The server may include a non-transient computer readable storage medium having executable instructions embodied thereon. The server might also include one or more hardware processors configured to execute the instructions. The processors might execute the instructions to provide the steps of the method and including a payment processing software component along with a network interface capable of communication with the venue-associated POS systems, mobile customer devices as well as the identity target devices associated with each customer location in the venues in question. The server will also comprise or be connected operatively to a payment processing gateway, capable of conducting payment transactions using customer payment details—for example a credit card processing gateway or the like. The necessary hardware and software components for the actual transaction processing could be within the server or could comprise an internally or externally connected related system.

The processors would execute the instructions stored within the server to execute the payment processing methods and transactions in accordance with the remainder of the invention outlined herein. It is specifically contemplated that the server could have the necessary components stored and executable therein to provide a Web server functionality capable of browser session communication with mobile customer devices of users, and that is one primary intended means of communication and transaction completion between the server and multiple mobile customer devices. In other embodiments, the mobile customer devices might contain proprietary or local software application capable of network communication with the server for completion of transactions in accordance with the remainder of the method.

The server would need to be capable of network communication with the mobile customer devices a customer seeking to pay for transactions within location-based sales venues and transact business therein, and would also need to be capable of network communication with the venue-associated POS systems of the venues within the system. Communication protocols and software for the communication of the server with these POS systems of various types are all contemplated within the scope of the present invention. As outlined above, the server would also need to be capable of direct or indirect network communication with each identity target device corresponding to customer locations within the sales venues in question.

The server outline and disclose will permit the completion of customer payment transactions regarding selected active customer locations in location-based sales venues under the method outlined above.

These and other features, and characteristics of the present technology, and the methods of operation and functions of the related elements of structure and the combination of parts and economies of manufacture, will become more apparent upon consideration of the following description and the appended claims referring to the drawings, which form a part of this specification, wherein like reference numerals designate corresponding parts in the figures. It is to be understood, however, that the drawings are for illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

While the invention is claimed in the concluding portions, preferred embodiments are provided in the detailed description which may be best understood with the diagrams where like parts in each of the several diagrams are labeled with like numerals, and where:

DETAILED DESCRIPTION

To appreciate the functionality of the present invention it is beneficial to establish certain terminology used in the remainder of the specification to describe the invention. The invention comprises a payment processing system and method for use in conjunction with location-based sales venues such as restaurants, arenas, hospitality establishments and the like were products or services are sold in relation to multiple customer locations 20 within the venue 22. For example in a restaurant, each table in the restaurant or in a more granular way each seat in the restaurant might constitute a separate customer location. While it is explicitly contemplated that the sales venues outlined herein would include hospitality venues such as restaurants, bars and the like, the invention could also be used in many other types of venues that had specifically enumerated customer locations 20—sports venues and the like come to mind for example. Any type of a sales venue 22 with multiple customer locations 20 in respect of which purchases of products or services might be posted to a POS system 2 for payment is contemplated to be within the scope of the present invention.

Within a location-based sales venue 22 there would be at least one venue-associated POS system 2. The venue-associated POS system 2 is the system in which purchases for individual customer locations 20 are catalogued for subsequent payment, charging or purchase. Some sales venues might actually have more than one venue-associated POS system depending on size or complexity. With a venue 22 having more than one venue-associated POS system, each customer location within the venue 22 would typically be assigned to a particular POS system for billing.

Figures 7A, 7B, 7C:
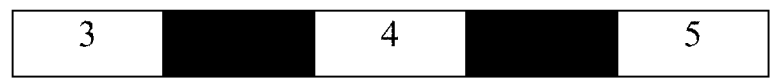
FIG. 7A is a first table seating arrangement.
FIG. 7B is a second table seating arrangement.
FIG. 7C is a bar seating arrangement.

A customer location comprises a specific billable location within a sales venue 22. For example in the restaurant at which the POS system captured purchases at the table level, each table might comprise a customer location 20. In other sales venues where a more granular billing system was used down to individual seating or standing positions for service or purchase, individual seats might each comprise an individual customer location 20. For example, many restaurants would have a seat by seat POS configurations so that they can track item orders for individual customers. The following shows a sample of a customer location configuration for a location-based sales venue 22, with three different groupings of customer locations 20. The first grouping (illustrated in FIG. 7A) of six customer locations 20 as shown is assigned in respect of a first table 21 being a table for six customers. The second grouping (illustrated in FIG. 7B) of four customer locations 20 as shown is assigned in respect of a second table 21 being a table for four customers, and the third sample (illustrated in FIG. 7C) is one example of a series of customer locations 20 that might for example be standing locations 20 in relation to the bar in a restaurant etc.

Any number of different types of seating or customer location configurations can be accommodated within the scope of the invention is it will be understood that each customer location 20 would be configured first in the venue-associated POS system, with a location record 13 in the location database 11 being aligned therewith.

It will also be understood that the location 20 that might be associated with an one-time identifier for use in the system of the present invention might be the table number rather than the specific seat number, where it was desired to initiate the potential for a payment transaction in respect of an entire table by triggering a transaction by reading a single location one-time identifier with the mobile customer device 5 of a customer. In such a case, the interface that is served by the server 1 to the mobile customer device 5 to finalize the transaction could allow for additional selection of individual customer locations 20 at the table in respect of which payment was desired to be processed.

Figure 1:
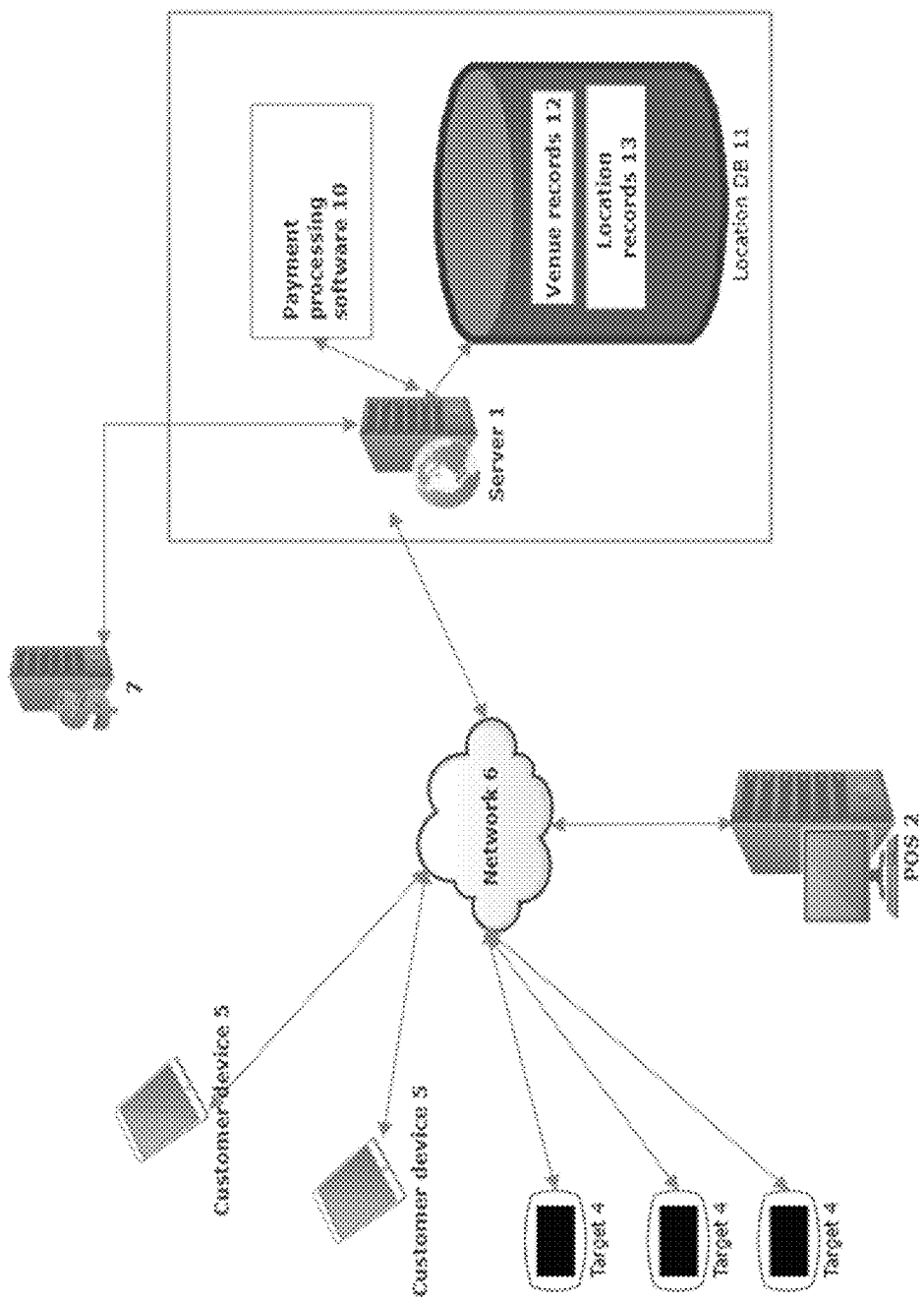
FIG. 1 is a schematic of a sample embodiment of a system under the present invention which could achieve the method outlined.

General System Architecture:

The method of the present invention will be deployed in individual location-based sales venues. Referring first to FIG. 1 there is shown a schematic drawing of a system in accordance with the present invention in respect of a single venue 22. The figure shows a server 1 comprising payment processing software 10 and a location database 11. The location database 11, as outlined in further detail elsewhere herein, is comprised of venue records 12 and location records 13.

The server 1 also comprises a payment gateway 7 for the processing of payment transactions. In this case, the payment gateway 7 is shown as a freestanding system connected to the server 1 externally. As outlined elsewhere herein it will be understood that the payment gateway could also be an integrated component up the server 1 in both such approaches are contemplated within the scope of the present invention. The specifics of payment gateway technologies and integration with point-of-sale systems will be understood to those skilled in the art and are all contemplated within the scope hereof.

The server 1 via a network interface 19 is connected to a network 6, permitting communication with other hardware components of the system of the present invention. Mobile customer devices 5 would also be connected to the network 6 such that customers using their mobile customer devices 5 could interact with the server 1 for the purpose of facilitating payment transactions.

Within the venue 22, there is a venue-associated POS system 2, capable of facilitating actual sales transactions to customers at individual customer locations 20 within the venue 22. The individual customer locations 20 within the venue 22 might comprise particular seating locations 20, pickup locations 20 or the like. The system of the present invention is particularly contemplated to be retrofittable to existing sales venues, since most POS systems 2 already have a network connection and are capable of communicating with external systems via a network 6 and on this basis the system of the present invention could be deployed in existing sales venues with only a modest software update to the POS system 2 to allow for communication of the POS system 2 with the server 1, or the installation of a basic hardware interface.

It is primarily contemplated that the server 1 would actually be located off-site and would be connected to multiple POS systems 2 in multiple venues. The system and method of the present invention could also be physically deployed on-site in a single location, using a local area network 6 to communicate between the server 1 and the POS system 2. Both such approaches are contemplated within the scope of the present invention—in network architectures in which the server 1 and the identity target devices 4 or the POS system 2 communicated via a local area network, it will be understood that it will still be required for some type of hardware and/or software to permit a network bridge with a wide area network in communication with the mobile customer devices 5.

Also shown in this figure are a plurality of identity target devices 4, which would be associated with individual customer locations 20. As outlined elsewhere herein, the individual target devices 4 would be electronic devices capable of the display or broadcast in a machine-readable format of one-time identifiers in respect of their associated customer locations 20. The target devices 4 in the embodiment shown, as well as the POS system 2, are all shown as being connected to the same wide area network 6 as the server 1 and the mobile customer devices 5.

The target devices 4 might be associated with individual customer locations 20 within the venue 22, or certain target devices 4 might actually be associated with multiple customer locations 20 permitting hardware consolidation to a degree within the venue 22 while still allowing for the practice of the method of the present invention.

The method of the present invention could be deployed on a service bureau basis, by providing the availability of the server 1 and its related back-office payment processing software component 10 for use in respect of multiple location-based sales venues.

Figure 2:
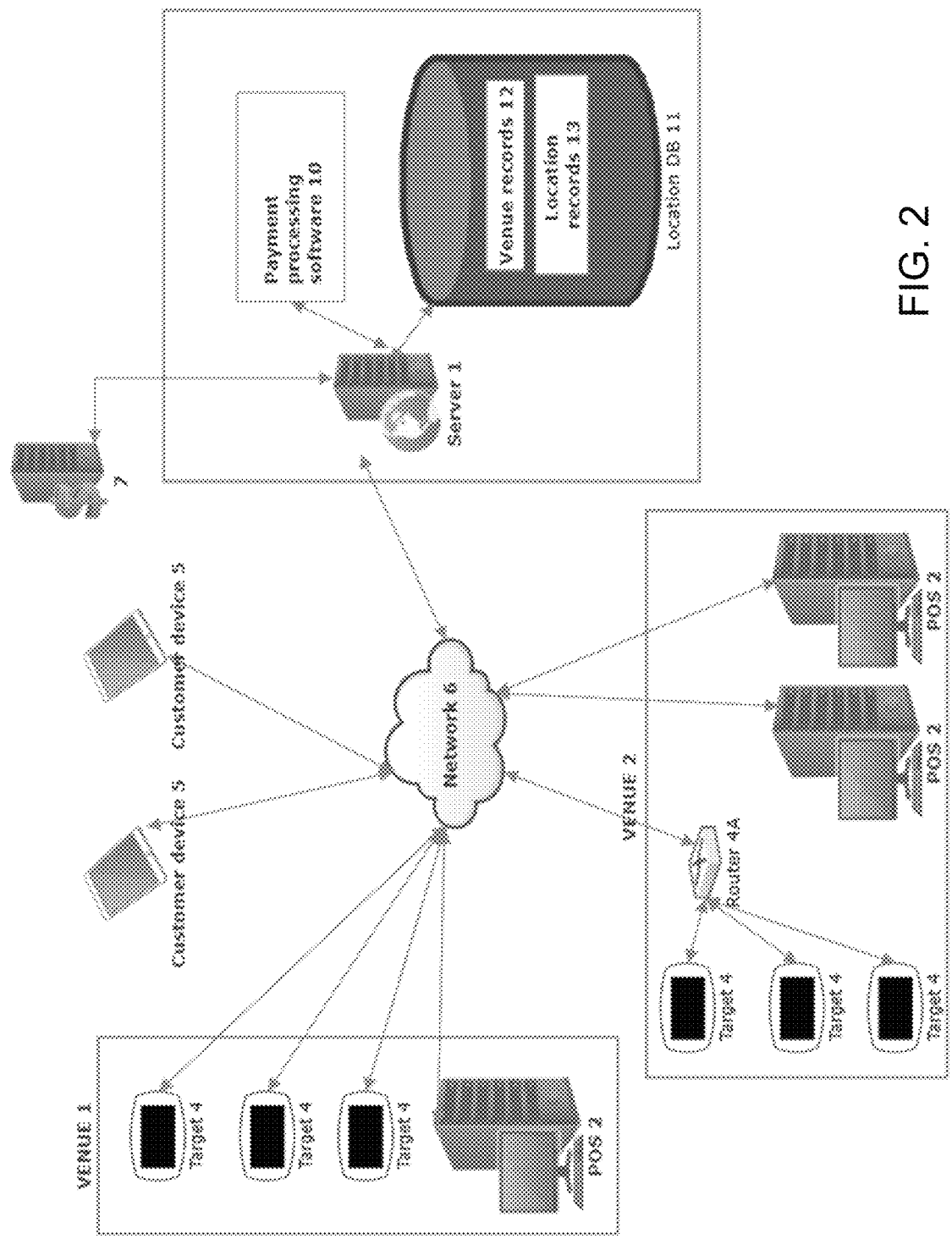
FIG. 2 is a schematic of an alternate embodiment of a system under the present invention, showing multiple venues.

Referring to FIG. 2 there is shown another demonstrative schematic of a system in accordance with the present invention, in which two location-based sales venues are shown for the purpose of a general outline of the anticipated operation of the system in multiple venues. The server 1 is shown similar to that of FIG. 1, and again an external payment gateway 7 is shown. This figure also demonstrates a plurality of mobile customer devices 5 connected to the network 6 in communication with the remainder of the components of the invention. The hardware shown in Venue 1 in this figure is the hardware shown in FIG. 1 i.e. a single POS system 2 and a plurality of identity target devices 4 in this case being three of same.

Venue 2 in this figure shows an alternate configuration in another location-based sales venue 22—specifically, the venue 22 having two POS systems 2 each of which might be associated with particular customer locations 20 within the venue 22, and the identity target devices 4 in respect of this venue 22 are shown connected to the network 6 through a router 4A. As discussed with FIG. 1 above, there will be different network topologies and architectures obvious to those skilled in the art of system and hardware communication and design and any type of a network architecture allowing for the necessary communication between the identity target devices 4 and the server 1, the POS systems 2 and the server 1, and the mobile customer devices 5 and the server 1 are all contemplated within the scope of the present invention. The identity target devices 4 might alternatively be operatively connected by some type of a network or communications bus directly to the local POS system 2 within a venue 22 limiting the number of communication connections required directly between the wide area network 6, the server 1 and on-site hardware. The necessary modifications to facilitate this type of a network connection will be understood to be within the scope of the present invention as well.

The system shown in FIGS. 1 and 2 each include hardware components existing within the individual location-based sales venues as well as the server 1 and target hardware 4 of the present invention.

Referring to the overall system embodiments of FIGS. 1 and 2, we will now describe the operation of the method of the present invention in further detail.

One-Time Identifiers:

The actual one-time identifier of a particular customer location 20 within a venue 22 which is assigned for use and displayed by the identity target device 4 associated with each customer location 20 is contemplated to be either a random or serial system wide one-time identifier. The one-time identifier would include no specific information that identified either the venue 22 or the customer location 20. The regeneration of one-time and dynamic one-time identifiers is at the core of the present invention.

The identity target devices 4, insofar as they display the one-time identifiers for acquisition by mobile customer devices 5, would not even need to include a display of any human readable indicia regarding the one-time identifier since it is explicitly contemplated that the mobile customer device 5 would read the identity target device and the displayed one-time identifier, which might either be displayed as a barcode or QR code for example on a visual display, or could be also transmitted by a low strength transmitter or beacon which is capable of being acquired and read by the hardware of the mobile customer device 5.

Sometimes the extractable one-time identifier preferred by an identity target device 4 would be a one-time link which would be used by software on the customer mobile device 5 to initiate a communication with the server 1 regarding the particular customer location 20—i.e. a link such as https://payserver.com/12erQ435pz.htm [this link being a randomly generated example]—where there was software on the customer mobile device 5 capable of opening a network or Internet link, such as a browser, a link such as this comprising the extractable one-time identifier within a target could for example initiate a browser session by the customer mobile device 5 with the server 1 of the present invention which might correspond to the "payserver.com" address, and the specific one-time identifier of the customer location might comprise the text "12erQ435pz". A location record 13 within the location database 11 could then contain the necessary additional information to map the random text "12erQ435pz" to a particular seating location and a particular POS system within a venue 22. In other cases, the information contained within the target and comprising the one-time identifier might take a different form. Both such approaches are contemplated within the scope hereof. Details of the one-time identifiers assigned to individual customer locations 20 within the sales venues would be stored in individual location records corresponding to the customer locations 20, in the location database 11 10. Using generic or non-identifying information as the system wide one-time identifier is key to the novelty of the method of the present invention insofar as it permits for the rapid deployment and maintenance of the system and method of the present invention.

The one-time identifier is any data token that is generated and does not include location or venue identifying information and is used on a one-time basis by the system and method of the present invention to identify a particular customer location 20 for a particular payment transaction.

The identity target devices 4 would be any type of an electronic device capable of network communication with the server 1 to receive information from the server 1 related to one-time identifiers to be displayed. Each identity target device 4 would be associated with at least one customer location 20 in the sales venue 22. In some embodiments a separate identity target device 4 would be used in respect of each customer location within the venue 22, and in other embodiments, an identity target device 4 might be associated with more than one customer location to minimize the amount of hardware required.

Figure 3:
FIG. 3 is a sample of a visual display of an identity target device under the present invention.

Two specific types of hardware devices which are contemplated for use as identity target devices 4 in accordance with the remainder of the present invention are either a network-capable device which includes a visual display, such as an e-paper device, a purpose built electronic device or even a specifically configured factory built smart device such as a tablet or the like, which includes a visual display which can display indicia capable of machine reading by a mobile customer device 5. Referring to FIG. 3 there is shown a sample of a visual indicia that could be used as a one-time identifier of a particular customer location 20 within a venue 22 and displayed such that the camera or other scanner of a mobile customer device 5 could read same and initiate a payment transaction.

In other embodiments of the method of the present invention, it is contemplated that the one-time identifier for an associated customer location 20 would be displayed by a low signal radio transmission, such as Bluetooth, RFID, NFC or the like and again the device could be a purpose built electronic beacon or any electronic device capable of transmission of such a signal and communication as required with the server 1 to acquire the necessary details of the one-time identifier to be displayed. Both such approaches, namely either an identity target device 4 using a visual display to display targets or one-time identifiers for acquisition by mobile customer devices 5, or beacons or radio transmitter devices capable of transmitting the necessary data for capture by a mobile customer device 5 for conversion into an one-time identifier which can be used to initiate a payment transaction in accordance with the remainder of the method are both contemplated within the scope hereof.

In a further embodiment of the identity target devices 4, the identity target devices 4 could each comprise electronic beacons or visual display units which were in short range network communication with a network transmitter operatively connected to the network 6, said transmitter capable of transmitting over short range information to those beacons or visual display units for display purposes. This would eliminate the need for multiple network connections of all of the identity target devices 4 in a particular venue 22, instead relying on only a single network device to communicate with the server 1 for this purpose. This type of an approach will also be understood to be within the scope of the present invention.

As outlined elsewhere herein, the identity target devices 4 could be connectable directly to the same network 6 as the server 1 and the POS system 2 in the venue 22, or in other cases could be connected via a local communications bus through the POS system 2 or otherwise to eventually be capable of communication with the server 1. Any type of communication design and a network design that allows for the individual identity target devices 4 to receive updated one-time identifier information to be displayed from time to time will be contemplated within the scope of the present invention.

Figure 5:
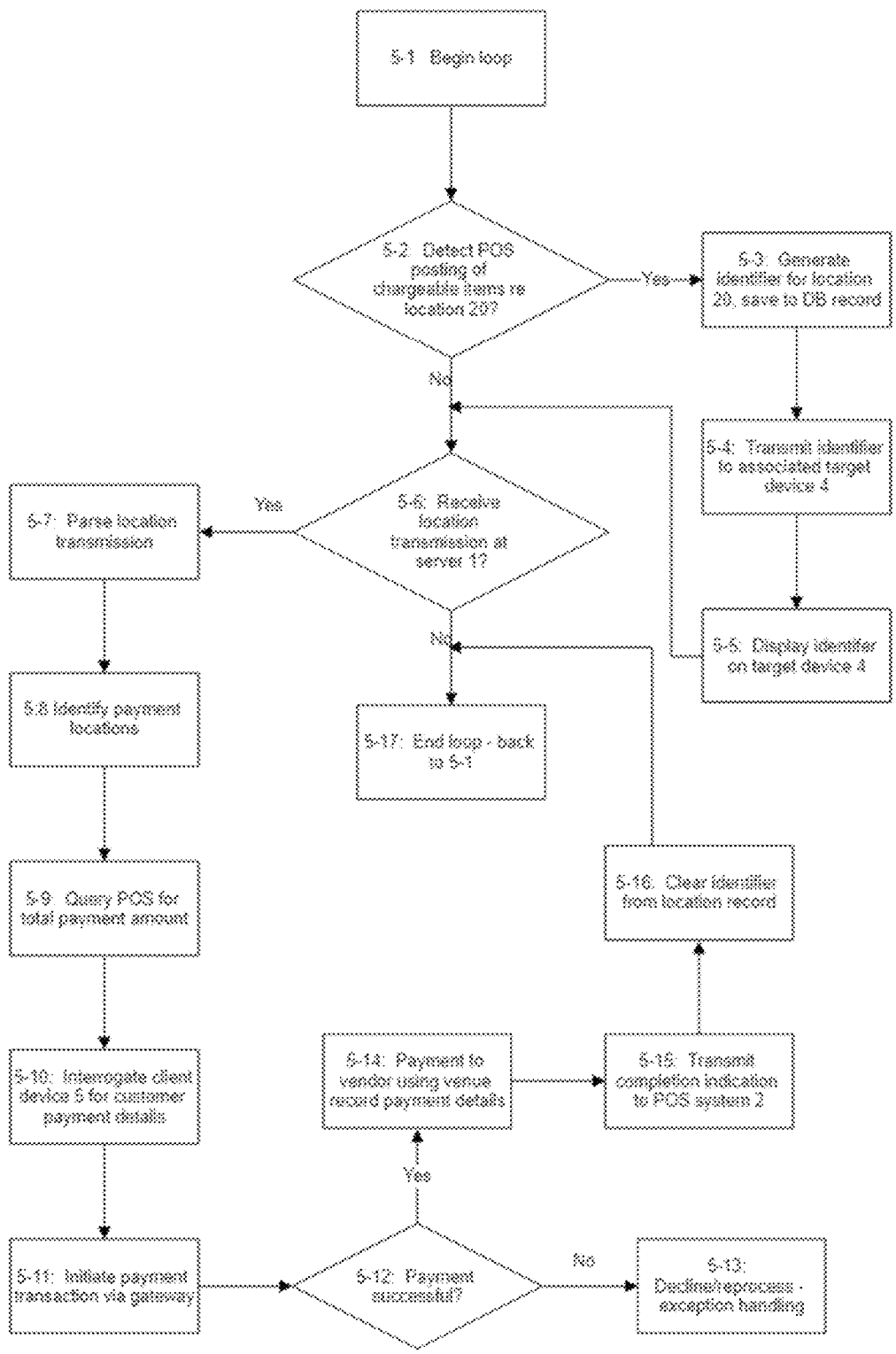
FIG. 5 is a sample schematic drawing of one data structure for the location database under some embodiments of the present invention, demonstrating the key components of the anticipated record structure.

Method Overview:

Referring to FIG. 5 there is shown a flowchart outlining the steps in one basic embodiment of the payment processing method of the present invention to facilitate the execution of a payment transaction by a customer in respect of purchases and a location-based sales venue 22 as outlined herein. Each customer location within the location-based sales venue 22 would have an identity target device 4 attached in proximity and associated therewith, which was readable by a mobile customer device 5 to yield the reading of a one-time identifier in relation to the customer location. That the physical identity target is machine-readable, versus requiring human intervention to manually transpose a serial code or the like into a computer program to allow for customer initiated self-service payment is another significant commercial benefit to the system and method of the present invention. The identity target devices 4 would permit for the dynamic display of the one-time identifiers associated with the customer locations 20, that is to say they would be capable of altering the one-time identifier information displayed for the machine-readable capture by mobile customer devices 5 depending upon generation of new one-time identifiers related to the customer locations 20 in accordance with the system of the present invention. Static identifiers would not be used in respect of individual customer locations 20 and sales venues in accordance with the specific method of the present invention.

The method is facilitated using a server 1, the further details of which hardware and software configuration are detailed elsewhere herein. The server 1 is in network communication with the identity target devices 4, the venue-associated POS system 2 of each venue 22, and at least one mobile customer device 5. The server 1 also comprises or is operatively connected to a payment gateway 7. The server will also host or be operatively connected to a location database 11 comprising, for each sales venue 22, a venue record 12 containing venue payment coordinates via which payments to the venue 22 can be electronically processed by the transaction gateway and network address details for the venue-associated POS system by which the server can communicate with same; and a location record 13 corresponding to each physical customer location 20 within the venue 22 and containing venue-specific location details corresponding to a customer location 20 defined within the venue-associated POS system 2, the network address details for the associated identity target device 4, and a one-time identifier associated with the location 20 capable of display by the associated identity target device 4.

The first step of the method shown in FIG. 5 is the commencement of a monitoring loop. Many different specific approaches to this will be understood to those skilled in the art—monitoring loop with the necessary listeners in the software and hardware interfaces of the server 1 and other related hardware components provides the starting point for the method of the present invention. The beginning of the loop is shown at stage 5-1. The individual steps shown inside the loop could be conducted in different orders or operations without departing from the intended scope hereof.

The server 1 of the payment processing software component 10, in communication with the venue-associated POS systems 2 would seek to identify the posting of new chargeable items in respect of individual customer locations 20 in managed venues. Upon the detection of the POS posting of chargeable items in respect of a particular customer location 20, which decision or monitoring loop block is shown at 5-2, that location 20 would be identified as an active location for the purpose of the payment method of the present invention. As shown at step 5-3, the server 1 in the software 10 would on the detection of an active location generate a new one-time identifier for use in correspondence to the location record 13 corresponding to the location in question 20. That newly generated one-time identifier will be saved to the corresponding location record 13. The next step of the method, shown at 5-4, would entail the transmission of the newly generated one-time identifier created in step 5-3 to the identity target device 4 associated with the active location, and the identity target device 4 upon receipt of such a transmission would display the new one-time identifier for acquisition by a mobile customer device 5. Updating the display of the identity target device 4 is shown at 5-5. Following the completion of this target rendering step based upon the transmission of a new one-time identifier to a device 4, the detection, monitoring an update of the display of the identity target device 4 in question would be completed and the monitoring loop could continue.

As outlined throughout, the server 1 could communicate with the identity target devices 4 either directly by the network 6, or in some cases the identity target devices 4 might be connected locally to the POS system 2 and reached by communication of the server 1 to the POS system 2 for the pass-through of the related updated one-time identifier information for display on the identity target device 4 in question. Both such approaches are contemplated within the scope of the present invention.

Monitoring of the POS systems 2 within the venues to detect the posting of chargeable items could either take place by ongoing polling taking place by the server 1 of those POS systems 2, or in other embodiments the POS systems could be programmed to transmit an indication of posting of such transactions to the server 1 periodically or in real time. Both such approaches are contemplated within the scope of the present invention.

Similarly, the updating of the one-time identifiers displayed by the target devices 4 to correspond to the most up-to-date and recent one-time identifiers stored in the corresponding location records and the location database 11 could be conducted based upon a periodic polling of the corresponding location records by the identifier target devices 4 which are network connected, or alternatively each of the identifier target devices 4 could receive periodic or real-time transmissions thereto with the necessary data for the one-time identifiers displayed to be up-to-date. Both such approaches are contemplated within the scope hereof.

In addition to monitoring and detecting the POS systems 2 in connected venues to detect the posting of chargeable items in the activation of particular customer locations 20 for charging purposes, the server 1 of the software 10 would also have a separate listening loop or necessary software or hardware in place to receive location transmission packets at the server 1 from mobile customer devices 5. A customer seeking to initiate a payment transaction would use their mobile customer device 5 to read the identity target device 4 in respect of the customer location or locations 20 in respect of which it was desired to initiate a payment transaction, and the customer device 5 would initiate the payment transaction by initiating a transmission of a location transmission packet to the server 1. The location transmission packet would comprise a data transmission containing the necessary data which when extracted would provide the one-time identifiers currently associated with each active location in respect of which it was desired to initiate payment. The listener and the receipt of a location transmission at the server 1 is shown in decision block 5-6.

When a location transmission packet is received at the server 1, the yes leg of the decision block is activated. The server 1 and the software 10 would parse the location transmission packet, shown at 5-7, to extract the one-time identifiers corresponding to the one or more customer locations 20 in respect of which it was desired to initiate a payment transaction. The payment locations 20, being the customer locations in respect of which payment was desired to be initiated would then be identified by matching the one-time identifiers extracted from the location transmission packet with the one-time identifiers stored in the location records 13 in the location database 11. This is shown at step 5-8. Comparing the one-time identifiers received in the location transmission packet with the one-time identifiers stored in the location records 13 and the location database 11 will permit the matching of the one-time identifiers with the POS location addresses required to conduct a query of the necessary venue-associated POS systems to identify the total payment amount for the transaction to be conducted. The querying of the venue-associated POS system or systems to identify or calculate the total payment amount to be obtained from the customer is shown at 5-9.

Following the ascertainment of the total payment amount, the server 1 and the software 10 would further interrogate the client device 5 having initiated the transaction for customer payment details, shown at 5-10. Interrogation of the client device 5 might comprise serving to the client device 5 an additional user interface through which customer locations 20 in respect of which payment was to be provided could be refined and payment details could be entered, or in other embodiments where automated electronic payment systems were already enabled on a client's mobile device, such as Apple Pay or touch banking apps etc., interrogation of the client device 5 could comprise exchanging the necessary information to further the processing of the electronic payment transaction in question. The customer payment details could also be obtained from the mobile customer device 5 at the time of initiation of the location transmission packet, by requiring at that point in the process the user to enter the necessary information, or the software on the mobile customer device 5 to include the necessary credentials or other information to allow for a secure payment to be conducted between the mobile customer device 5, the server 1 and the payment gateway 7. Both such approaches to the capture of the necessary customer payment details will be understood to be within the scope of the present invention.

Once the customer payment details were obtained, the server would initiate the required payment transaction for the total payment amount by the gateway 7—this is shown at step 5-11. Many customer mobile devices 5 including smart phones such as an Apple iPhone or the like include software-based payment capabilities where a software wallet is maintained within the device allowing customers to facilitate payment for several types of commercial transactions. It is explicitly contemplated that the payment transaction initiated regarding a particular location transmission accordance with the remainder of the method of the present invention could be facilitated by the server 1, with appropriate authentication or permissions, working in conjunction with the authenticated customer mobile device 5 to facilitate an automated payment transaction in accordance with the software wallet—in the Apple iPhone example, opening the link back to the server 1 of the present invention could with the appropriate and necessary exchange of information between the server 1 and the smart phone 5 trigger an Apple Pay transaction. The Apple example outlined is only one of several types of automated wallet transactions which could be used, since virtually every smart device manufacturer and others offer online or mobile electronic wallet services and several types of electronic wallet services and payment facilitation methods can be conceived operate in communication with the remainder of the software and method of the present invention to facilitate the fastest possible authorization and processing of payment in a service venue 22 regarding one or more customer locations 20. All such approaches are contemplated within the scope of the present invention.

If the payment is successful, which is tested in decision block 5-12, payment would be issued to the vendor by the gateway 7, using the venue payment coordinates. The venue record 12 for the venue 22 and the associated POS system would include the necessary information for the server 1 and the payment processing software 10 to immediately issue a payment to bank details or other coordinates of the vendor operating the venue 22, or to capture those for accounting purposes for aggregated forwarding of funds at a later time. Issuance of the payment to the vendor in this fashion is shown at step 5-14. Following issuance of the payment to the vendor or in parallel track therewith, the server 1 would transmit a completion indication to the POS system 2, so that the POS system would know that the payment had been completed in respect of the payment locations 20 and that those customer locations 20 could be cleared on the system and opened for further posting our new customers. Finally, the server 1 would clear the one-time identifiers currently stored on the location records and location database 11 in respect of the payment locations 20 from the transaction, to remove the one-time identifiers and allow the generation of new one-time identifiers when a new posting transaction were initiated by the POS system in respect of those customer locations 20. These steps represent the end of the yes loop of payment success block 5-12. The loop would end as shown at step 5-17 and loop back to 5-1.

If the processing of a payment to the customer payment details was not successful in the test applied in 5-12, the software 10 and the server 1 could be programmed, as shown at step 5-13, to have an error handling or exception handling procedure to allow for reprocessing or handling of declined payment transactions, following which the loop would be continued.

As detailed throughout, the software on the mobile customer device 5 which would be able to read the one-time identifier displayed by an identity target device 4 could be a pre-existing software component on the operating system or on the mobile customer device 5, or could be a custom local application. Both such approaches are contemplated within the scope of the present invention although it would be most desirable to come up with embodiments of the method of the present invention which were used pre-existing and widely available operating system type component software to actuate transactions, since that would result in the quickest and easiest adoption by various customers and consumer groups of the method of payment of the present invention.

One specifically contemplated approach in the method is that the one-time identifier as displayed would be a data token that contained a one-time web link, and pre-existing software which would be used to read the web link would comprise a reader capable of parsing that one-time identifier either from the visually readable or machine-readable data stream to extract the web link and open the web link to initiate the subsequent payment interaction between the customer and their mobile device, and the server.

By erasing and regenerating the one-time identifier for each customer location 20 for each payment transaction, the method is most secure from the perspective of both the venue 22 and the customer. The method of dynamic rendering of the identity target devices 4 to display the up-to-date one-time identifiers every time a new transaction is completed or initiated is at the core of the present invention and will be understood to be novel and patentable over the current state-of-the-art.

In other embodiments of the method of the present invention, rather than regenerating the one-time identifier when a customer location 20 is activated by posting of new POS charges, one-time identifier could be regenerated upon the completion of the previous purchase transaction such that the identity target device 4 could be updated to transmit or display the new one-time identifier earlier in the process. Both such approaches are contemplated within the scope hereof.

Venue-Associated POS Systems:

It is specifically contemplated that the method of the present invention can be practiced in conjunction with pre-existing venue-associated POS systems 2 in various location-based sales venues. For example if the sales venues are hospitality establishments—restaurants and bars or the like—pre-existing POS systems 2 exist which allow for the tracking of charges against individual customer locations 20 within the venue 22. Many of these venue-associated POS systems 2 already permit for an Internet or network interface to allow for credit card processing or the like, so adaptation of the network interface on the venue-associated POS system 2 to permit exchange of information between the venue-associated POS system 2 and the server 1 of the present invention could be achieved often with simple software modification or opening of a communication channel between these devices. In other systems, a hardware interface might need to be installed on site to permit communication between older pre-existing POS systems without the same network communication capabilities, and the server.

Certain venue-associated POS systems 2 are already operatively connected to a centrally based vendor cloud or vendor location database 11 or collection system that might also permit a simple API lookup or API communication between the server 1 of the present invention and the pre-existing network backend of the venue-associated POS systems 2. Any type of a communication conduit which can be created between the vendor-based POS systems 2 within a particular location-based sales venue 22 and the server 1 of the present invention will all be understood to be contemplated within the scope of the present invention.

As outlined in further detail elsewhere herein, some sales venues may have more than one POS system 2 located therein, with each POS system 2 responsible for charging or tracking regarding a certain subset of the customer locations 20 in the venue 22. Modifications can be made to the location database 11 and the location records tracked regarding individual customer locations 20 to permit proper communication or queries in lookups regarding an individual customer location 20 within the venue 22 and processing of payment transactions in respect thereof.

So long as the venue-associated POS systems 2 were capable of network communication with the server 1, no significant hardware would be required onsite within a venue 22 to permit the practice of the method of the present invention. Sometimes the only hardware or venue specific customization required would be a hardware or software adapter or modification to be installed to permit network communication of the venue-associated POS system 10 or systems with the server.

Certain venue-associated POS systems 2 may communicate using different communication protocols, authentication methods or the like, and it will be understood that the server and the remainder of the method of the present invention could be modified or customized to permit communication with venue-associated POS systems of multiple types of communication protocols and all such types of communication and necessary modification to the communication components of the software on the server under the remainder of the present invention are contemplated within the scope hereof.

Figure 4:
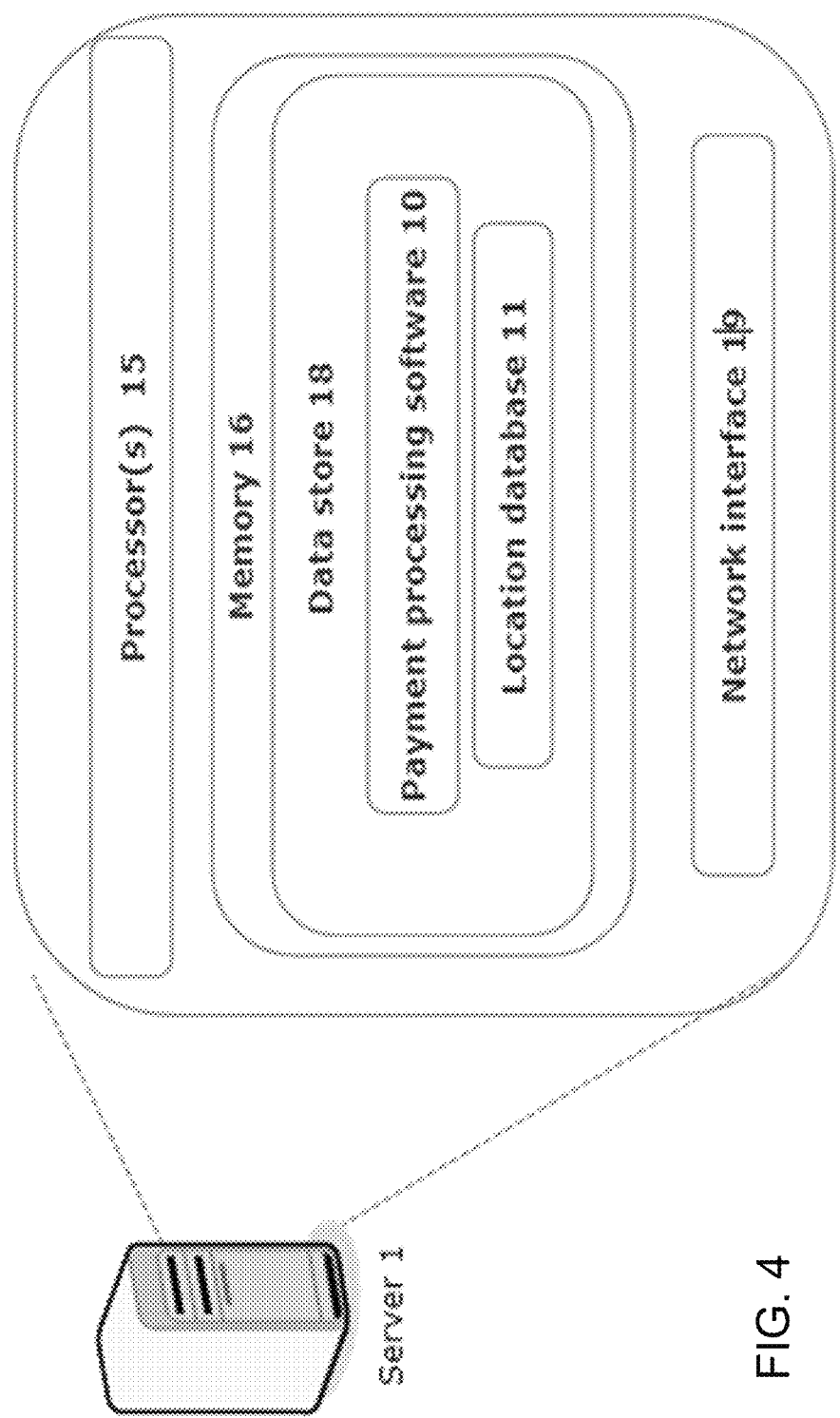
FIG. 4 is a block diagram showing the components of a server under the present invention.

Server Architecture:

The server 1, a sample embodiment of which is shown in FIG. 4, might consist of one or more servers 1—a single server or a server farm approach. The server 1 would comprise one or more processors 15 and memory 16. The memory 16 might contain various software components or processor instructions for the method of the present invention or otherwise in operating the server 1. Processor instructions corresponding to the order processing software component are shown stored within the memory 16 in this figure. Server(s) 1 may be configured by machine-readable instructions, which may include one or more instruction modules. The instruction modules may include one or more of server firmware or operating systems, the payment processing software 10, and/or other instruction modules.

Memory 16 may comprise non-transitory storage media that electronically stores information. The electronic storage media of memory 16 may include one or both of system storage provided integrally (i.e., substantially non-removable) with server(s) 1 and/or removable storage that is removably connectable to server(s) 1 via, for example, a port (e.g., a USB port, a firewire port, etc.) or a drive (e.g., a disc drive, etc.). Memory 16 may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 6 may include one or more virtual storage resources (e.g., cloud storage, a virtual private network, and/or other virtual storage resources). Memory 16 may store software algorithms, information determined by processor(s) 15, information received from server(s) 1, information received from client devices 5, and/or other information that enables server(s) 1 to function as described herein.

Processor(s) 15 may be configured to provide information processing capabilities in server(s) 1. Processor(s) 15 may include one or more of a digital processor, an analogue processor, a digital circuit designed to process information, an analogue circuit designed to process information, a state machine, and/or other mechanisms for electronically processing information. Although processor(s) 15 as shown in FIG. 4 as a single entity, in some implementations processor(s) 15 may include a plurality of processing units. These processing units may be physically within the same device, or processor(s) 15 may represent processing functionality of a plurality of devices operating in coordination.

In many embodiments, the server 1 is contemplated to be a Web server, where client devices 5 would use a web browser for interaction therewith. Where a local app was developed, server 1 might not be a Web server per se but might be a server 1 capable of interaction with the type of an interface on remote client devices. Either such approach is contemplated within the scope hereof.

Server 1 would host or be operatively connected to the data store 18. Besides the general operating system instructions, the server 1 would comprise a payment processing software component 10 which would be responsible for execution of the method of the present invention at the server and coordinating the communication with mobile devices 5 of customers. The payment processing software component 10 might itself act as the interface between the remainder of the hardware and software of the server 1 and the data store, or the server 1 might include additional software interfaces to the data store 18.

The payment processing software component 10 would comprise subroutines to administer the data store, creating, modifying and processing payment transactions and records in the data store, and additional financial or numerical transactions, searches or reporting as required. The details of operating the payment processing software component 10 are outlined elsewhere herein.

Server 1 also requires integration or connection of a transaction gateway 7, to facilitate the remainder of the method. Some embodiments of the method of the present invention might comprise the incorporation of the additional hardware and software components within server 1 and its associated hardware and software to allow the server 1 itself to act as a transaction gateway 7 to process payment transactions directly regarding method transactions being executed under the remainder of the method, to the payment methods or credit cards of customers, and crediting the amounts recovered back to the vendors. Where in certain cases the transaction gateway 7 would be operated as a component of the server 1, in other cases, the server 1 might be connected via its at least one network interface 19 to externally provided transaction gateways in both such approaches are contemplated within the scope of the present invention. The design of a transaction gateway and communication between the transaction gateway 16 in the server 1 of the present invention will be understood to those skilled in the art of developing POS and e-commerce systems and all such approaches are contemplated within the scope of the present invention.

Server 1 would also include at least one network interface 19 to communicate with the venue-associated POS systems 2, the identity target devices 4 and mobile customer devices 5. It will be understood by those skilled in the art of network design and hardware and software design that certain server architectures might include more than one network interface 19 and any type of a server 1 and network interface design which enabled the communication of the server 1 the at least one data network outlined in the remainder of the method would all be contemplated within the scope of the present invention.

Network:

It is specifically contemplated that the communications network 6 which would be used for communication between the server 1, the venue-associated POS systems 3, the identity target devices 4 and the customer mobile devices 5 of customers would be the Internet or another publicly available wide area network. The removal of a requirement for a proprietary or closed communications network between remote venue-associated POS systems 3, customer mobile devices 5 and the server 1 facilitating the method represents one significant enhancement and cost efficiency of the method of the present invention. The specific protocol of communication between the various devices could vary, and differing communication protocols could be used between different devices in the system—all such approaches and architectures will be understood to those skilled in the art of wide area computer network design and all such approaches are contemplated within the scope of the present invention. In certain embodiments of the system and method of the present invention more than one communications network might be used.

The server 1, venue-associated POS systems 3, the identity target devices 4 and the customer mobile devices 5 would need to each comprise a network interface, capable of communicating with the at least one communications network 6. It is explicitly contemplated that the wide availability of Internet connectivity would comprise the best, simplest and most cost-effective network communications infrastructure to effectively implement the method of the present invention, although it will be understood that private networks could also be used albeit with the added cost and complexity in terms of client software for communication. Both such approaches are contemplated within the scope of the present invention.

Also contemplated is a scenario in which more than one communications network 6 was used.

Mobile Customer Devices:

The method of the present invention explicitly contemplates the use of network enabled mobile customer devices 5 by customers to initiate payment transactions pursuant to the remainder of the method. It will be understood to those skilled in the art of client/server application design that any type of a smart device or mobile device which could communicate with the server 1 via a network and related network interface 19 would be within the scope of the present invention. Smart phones, PCs and other remote and network capable computing devices are all devices contemplated within the scope, insofar as they will each include a network interface 19 by which the mobile customer device 5 could communicate via a data network with the server 1. The majority of these types of commercially available hardware devices would already include all of the necessary hardware and software components to participate in the method of the present invention, which will maximize the ease and speed of deployment of the method of the present invention. Any type of a computing device capable of interaction with the server 1 and any of the remainder of the system of the present invention is contemplated within the scope hereof. The ideal mobile customer device 5 would be a smart phone with either a camera or a radio transceiver, capable of reading QR codes or barcodes, or various types of radio beacons, respectively—the means of one-time identifier displayed by the identity target devices 4 would coordinate with the capabilities of the mobile customer devices 5.

The customer mobile device 5 could include pre-existing software, such as scan reading software and a browser for example, which could facilitate the method of the present invention, or in other cases specific purpose built client software could be used. Architecturally and conceptually, the concept of "apps" used on smart phones and other personal devices as a front end to centrally hosted systems is widely known. Where an interface is provided on the customer mobile device 5, the user of the customer mobile device 5 could interact with the system and the server 1 of the present invention by sending and receiving information between the interface of the customer mobile device 5 and the server using Internet communication protocols or the like between the customer mobile device 5 and the server 1. The specifics of implementing the client/server software system using a website or at a central bureau and an interface on the customer mobile device will be easily understood by those skilled in the art of client/server software design and the method of implementation of such a similar approach is contemplated within the scope of the present invention.

Conceptually the use of a local app as the front end or interface to the server of the present invention, is at least as likely as the possibility of using a browser to facilitate the use of the method of the present invention. Development of either a browser interface or a local app interface as the user interface between the customer at the customer mobile device 5 and the server 1, and the remainder of the centrally located method and architecture of the present invention, will be understood to those skilled in the art of client/server location database 11 and application design and all such approaches are contemplated within the scope of the present invention.

Location Database:

Any type of a hardware or software data structure capable of storing the information the required data subsets in respect of venues, customer locations 20 and purchase transactions are contemplated herein. The data store 18 might be resident on the server 1, or might be located and administered remotely and operatively connected to the server 1 via a network or other communications bus. The location database 11 would include the necessary information to practice the method including a venue record 12 corresponding to each location-based sales venue 22. The venue record 12 for a venue 22 would include the necessary venue payment coordinates used to process payments that vendor or its operator on the one or more transaction gateways integrated or operatively connected to the server 1 and would also include any network address details required or other communication requirements to enable the communication of the server 1 with each venue-associated POS system 2. Different venues may include different POS systems 2 some which communicate using different communication protocols, different security credentials or the like and all the necessary information to identify and allow the server 1 and the associated payment processing software component 10 to configure itself to communicate with those POS systems 2 or regarding transactions with transaction gateways 7 in that regard is all contemplated to be within the scope of the information which could be designated into the data structure of the venue record 12.

Location database 11 will also include a location record 13 in respect of each physical customer location 20 at each managed venue 22. The location record 13 would contain the necessary information to match up the location record 13 with a particular customer location 20 on the venue-associated POS system 2—for example a particular seating location of the like. For example, venue-associated POS system 2 in a hospitality establishment would contain the software and records to allow for food and beverage orders to be placed in the system 2 Re: individual senior table locations 20 within the establishment, which individual senior table locations 20 would comprise individual customer locations 20 in the context and lexicon of the present invention. Use of the location records 13 to match the generic and non-location identifying one-time identifiers for each customer location 20 with the POS locations 20 corresponding to each identity target device 4 used in one or more venues would be key. In addition to the POS system network address related to the particular location 20, the location record 13 would include a field that could contain data of the appropriate format to represent the one-time identifier generated by the software to be used during a payment transaction to identify that particular customer location 20. That field could be updated by the software 10 as required, and would contain the information transmitted to the identity target devices 4 during the target rendering step of the method. Design of an appropriate record structure in the location database 11 to record the lookup information to match the targets 4 with the customer locations 20 will be understood to those skilled in the art of software and location database 11 design and any type of an approach that achieves this objective are contemplated within the scope of the present invention.

Figure 6:
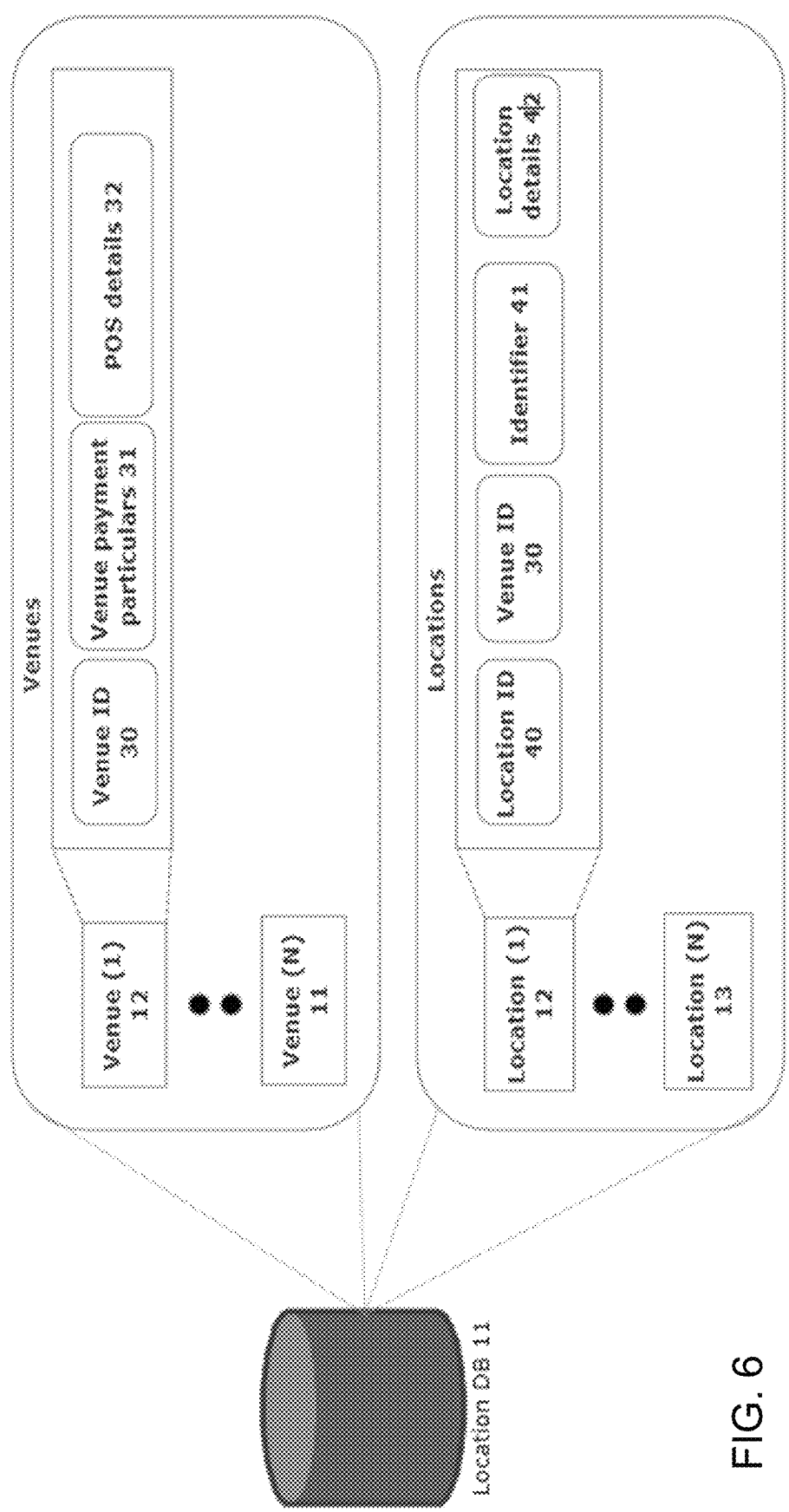
FIG. 6 is a flow chart showing the steps in one embodiment of the method of the present invention.

FIG. 6 shows a sample data structure of the location database 11 in accordance with one embodiment of the present invention. As outlined above, a venue record 12 would exist in the database 11 in respect of each venue 22 in respect of which the method was to be administered. In respect of the venue records 12 that are shown, there is shown a record key being a venue 22 one-time identifier 30, which from the database and record identifying perspective would be understood to those skilled in the art of database design. In addition to the venue 22 ID 30 there is also shown payment particulars 31 that would be stored in the venue record 12. The payment particulars 31 would comprise the necessary information to be used to process payments for transactions within the venue 22 and appropriately route the recovered payment amounts and funds to the operator or vendor of that venue 22. Also shown are POS system details 32. The POS detail 32 would be any necessary information required for the server 1 to communicate with each venue-associated POS system 2 within the venue 22. This might comprise network addresses, security or authentication credentials or the like. Again the rough structure of this record and database is shown in this figure simply to demonstrate the nature of a basic record structure contemplated and it will be understood that any number of other architectural approaches could be taken to a location database 11 and the type of information required to administer the method of the present invention without departing from the desired scope and intention thereof.

There are a plurality of location records 13 corresponding to the total number of customer locations 20 within the total number of venues administered in accordance with the system. Obviously different architectural approaches could be taken to the completion or delivery of this type of a structure. As shown, there is a record key or a location ID 40 which will be understood to those skilled in the art. Each location record 13 would in some fashion in the data structure of the database 11 be cross-referenced to its appropriate location record 13 11, as is shown by the presence of the corresponding venue 22 ID 30 in each location record 13 as shown. The other key information to be tracked within each location record 13 would be the one-time non-location identifying one-time identifier that has been associated with that particular customer location within the venue 22—the one-time identifier is shown at 41. The one-time identifier 41 is the information used to initiate a payment transaction in accordance with the remainder of the present invention by extraction of the one-time identifier 41 from the scandal or reading of the physical identity target in respect of the particular location by a customer device 5.

Also shown is a POS ID 42. The POS ID 42 would be any necessary information required to relate the particular physical customer location within the venue 22, in respect of which the location record 13 corresponds, to a particular POS system and POS location within the venue 22. The POS ID 42 would be any necessary address or link information which could be used in communication with the associated POS system to identify the corresponding customer location as was tracked within the POS system—for example each customer location within a venue 22 containing one or more POS systems would already have some type of an one-time identifier be that a table number, seat number or the like which has been assigned in respect of the location and is used for the purpose of tracking and generating POS billing. The POS ID 42 which would be stored within the location record 13 would be any necessary information to cross-reference the POS bill in association of the location on the appropriate venue-associated POS system to the physical identity target identified in the record 13. For example in a venue 22 having more than one venue-associated POS system 2, it would potentially be necessary to identify which POS system was responsible for tracking and billing in respect of the particular customer location. As well, that POS ID 42 might actually include the seat number or other type of a system address used by the venue-associated POS system in question to identify the particular billing record within that related POS system 2 from which the billing amount related to the particular customer location can be identified for billing and payment purposes. The POS ID 42 might represent any necessary information that could be used to communicate with an appropriate venue-associated POS system 2 the purpose of identifying the amount of a payment transaction required to clear the POS billing in respect of that particular customer location in the venue 22.

Additional information related to the location subject of the location record 13 could also be stored. This might include other field information for display on reports or other information that might be required for the purposes of the method of the present invention or other POS for tracking purposes.

The particular construction or data structure of the data store and individual data stored therein might also depend on the infrastructure design of the remainder of the system of the present invention. Again, the various aspects of the system, its structure and database design will be understood to those skilled in the art of relational database and client/server system design and are all contemplated within the scope of the present invention.

It is contemplated that the software of the server 1 may include a module or an interface permitting the installer of a system in accordance with the method of the present invention, or the vendor/operator of a venue 22, to quickly create or maintain the lookup location records 13 and to adjust or create the necessary records to match up individual deployed physical identity targets with locations 20 within the menu. Quickly interfacing this will allow for the quick deployment and replacement of physical identity targets where replacement or repairs required, or new locations 20 are categorized or required to be added to the system. Provision of a software interface permitting an administrative user to administer the location records 13, or even the venue records 12 within the order database, will be understood to those skilled in the art of order database design as well and will also be understood to be contemplated within the scope of the present invention.

It is explicitly contemplated that the system in the method of the present invention could be delivered as a service bureau type of a product, whereby the provider of the service and infrastructure of the present method could provide service to multiple venues in multiple customers and operators of venues. It is as such explicitly contemplated that embodiments of the method and the database of the present invention would explicitly incorporate any necessary security and other configuration to allow for compartmentalized operation and transaction processing by the system and method of the present invention on behalf of multiple customers of multiple vendors and multiple venue 22 operators—the incorporation of such a security model to the database and software of the present invention will be understood to those skilled in the art and is explicitly contemplated within the scope hereof as well.

Table Payment Workflow:

In addition to a workflow as outlined above where the user via their mobile customer device 5 could initiate a payment transaction in respect of one or more customer locations 20 by scanning or reading the related identity target devices 4 with respect to each of the customer locations 20 in question, as a result of which the one-time identifiers for each of those active locations for which payment is to be processed would be contained within the transmitted location transmission packet received by the server to initiate the payment transaction, it is specifically contemplated that to minimize the amount of hardware required to deploy the payment method of the present invention in a larger location based sales venue, and specifically for example in the case of multi-seat tables or the like, rather than providing a readable identity target device 4 which would provide a one-time identifier related to an individual seat or customer location 20, the device 4 might provide a target which was readable as a one-time identifier that identified the table or the entire plurality of logically associated customer locations 20, and when the payment transaction was initiated using the mobile customer device 5, the server could serve a user interface to the mobile customer device allowing the user to confirm a selection of some or all of the individual customer locations 20 at that table. This approach is also contemplated within the scope of the present invention—the ability to limit the amount of required identity target hardware devices 4 for a particular installation would make this desirable, and the attendant modifications required to the user interface to be served by the server 1 to the mobile customer device 5, or from the POS system 2 associated there with, will all be understood to those skilled in the art and are all contemplated within the scope of the present invention.

Although the present technology has been described for illustration based on what is currently considered the most practical and preferred implementations, it is to be understood that such detail is solely for that purpose and that the technology is not limited to the disclosed implementations, but, on the contrary, should cover modifications and equivalent arrangements within the spirit and scope of the appended claims. For example, it is to be understood that the present technology contemplates that, to the extent possible, one or more features of any implementation can be combined with one or more features of any other implementation.

In addition, it will be apparent to those of skill in the art that by routine modification the present invention can be optimized for a wide range of conditions and application. It will also be obvious to those of skill in the art there are various ways and designs with which to produce the apparatus and methods of the present invention. The illustrated embodiments are therefore not intended to limit the invention, but to provide examples of the apparatus and method to enable those of skill in the art to appreciate the inventive concept.

The invention claimed is:

1. A method of processing payments for at least one location-based sales venue containing a plurality of customer locations and having a network-connected venue-associated POS system and a network-connected identity target device capable of dynamically displaying an one-time identifier readable by mobile customer devices associated and attached in proximity to each customer location, the method comprising:
   a. providing a server including a payment processing software component, a network interface capable of communication via at least one data network with mobile customer devices as well as with all of the venue-associated POS systems and identity target devices, a transaction gateway through which customer payments can be processed, and a location database comprising, for each sales venue:
      i. a venue record containing venue payment coordinates via which payments to the venue can be electronically processed by the transaction gateway and network address details for the venue-associated POS system by which the server can communicate with same; and
      ii. a location record corresponding to each physical customer location within the venue and containing venue-specific location details corresponding to a customer location defined within the venue-associated POS system, the network address details for the associated identity target device, and a one-time identifier associated with the location capable of display by the associated identity target device;
   b. in a monitoring step, using the payment processing software component and the server to monitor any posting in venue-associated POS systems in respect of customer locations within associated venues and upon detection of the posting of any chargeable amounts in respect of a customer location, which is then an active location:
      i. generating and storing a one-time identifier to the location record corresponding to the active location; and
      ii. transmitting the generated one-time identifier to the identity target device associated with the active location;
   c. in a target-rendering step, on receipt of a transmission of a generated one-time identifier by identity target device, displaying said one-time identifier via the identity target device such that it is readable to mobile customer devices in proximity to the associated customer location;
   d. conducting transaction payments as desired to be completed by customers in respect of customer locations in sales venues using the server and the payment processing software component by, in respect of each transaction payment desired to be facilitated:
      i. receiving at the server a location transmission from a mobile customer device, said location transmission containing data corresponding to the readable one-time identifier displayed by the identity target device in respect of each active customer location in respect of which payment is desired to be processed;
      ii. on receipt of a location transmission at the server, parsing the received location transmission to extract the one-time identifiers associated with each of the payment locations and the customer payment details;
      iii. identify payment locations by selecting the location records from the location database corresponding to each payment location by matching the one-time identifiers extracted from the location transmission with the one-time identifiers stored in the individual location records;
      iv. using the selected location records, processing payment for the transaction by:
         1. conducting a query of the venue-associated POS system to identify the total payment amount required from the customer in respect of all of the payment locations;
         2. triggering a payment transaction via the transaction gateway in the total payment amount using customer payment method details provided from the mobile customer device and the venue payment coordinates from the venue record associated with the payment locations;
         3. on completion of the payment transaction:
            a. transmitting a payment completion indication to the venue-associated POS system in respect of the payment locations; and
            b. updating the location record for each payment location by removing the stored one-time identifier therefrom;
wherein the one-time identifiers do not correspond specifically to physical location details of the corresponding customer location and are not duplicated on any two location records; and
wherein the one-time identifiers used in respect of location records and payment locations in a particular payment transaction are not reused in subsequent payment transactions by the server.

2. The method of claim 1 wherein the customer payment method details required to finalize a payment transaction are provided by the mobile customer device to the server within the location transmission.

3. The method of claim 1 wherein the customer payment details required to finalize a payment transaction are provided from the mobile customer device initiating the payment transaction in the course of a user interaction session with the server following the initiation of the payment sequence.

4. The method of claim 1 wherein the venue-associated POS systems will push details of posted chargeable payment amounts to the server as they are posted to the POS systems and the monitoring step is conducted via a network listener receiving and processing such details at the server.

5. The method of claim 1 wherein the monitoring step is conducted by periodic polling of each venue-associated POS system by the server.

6. The method of claim 1 wherein the identity target devices and associated operating software listen to the network interface to receive transmissions of generated one-time identifiers to initiate the target-rendering step.

7. The method of claim 1 wherein the target-rendering step is conducted by periodic polling of the server and the location database with associated location records by each identity target device.

8. The method of claim 1 wherein the payment completion indication includes details of the total payment amount processed including discounts or gratuities.

9. The method of claim 1 wherein the number of venue-associated POS systems associated with a venue is one.

10. The method of claim 1 wherein the number of venue-associated POS systems at a venue is more than one and the location records corresponding to the managed premise do not all use the same venue-associated POS system.

11. The method of claim 1 wherein the one-time identifier displayed by an identity target device in respect of an associated customer location will be read by pre-existing software on the mobile customer device, and the reading of the one-time identifier will result in the initiation of a location transmission to the server.

12. The method of claim 11 wherein the server is a web server, the one-time identifier contains a one-time web link and the pre-existing software comprises a reader capable of parsing the one-time identifier to extract the web link and open the parsed web link to initiate the location transmission and subsequent payment interaction between the customer and the server.

13. The method of claim 1 wherein a mobile customer device contains a locally installed application for communication with the server and facilitation of the method.

14. The method of claim 1 wherein the identity target devices comprise e-paper devices, mobile computer devices with video display, or freestanding video displays, each having the necessary controller and software thereon to enable network communication with the server along with the machine-readable visual display of one-time identifiers corresponding to associated customer locations.

15. The method of claim 1 wherein the identity target devices comprise short-range radio beacons with the necessary controller and software thereon to enable network communication with the server along with the machine-readable transmission of data corresponding to one-time identifiers corresponding to the associated customer locations.

16. A system for the processing of payments for at least one location-based sales venue containing a plurality of customer locations and having a network-connected venue-associated POS system, said system comprising:
  a. a network-connected identity target device capable of dynamically displaying an one-time identifier readable by mobile customer devices associated and attached in proximity to each customer location; and
  b. a server including a payment processing software component, a network interface capable of communication via at least one data network with mobile customer devices as well as with all of the venue-associated POS systems and identity target devices, a transaction gateway through which customer payments can be processed, and a location database comprising, for each sales venue:
    i. a venue record containing venue payment coordinates via which payments to the venue can be electronically processed by the transaction gateway and network address details for the venue-associated POS system by which the server can communicate with same; and
    ii. a location record corresponding to each physical customer location within the venue and containing venue-specific location details corresponding to a customer location defined within the venue-associated POS system, the network address details for the associated identity target device, and a one-time identifier associated with the location capable of display by the associated identity target device;

said system operating by:
  a. in a monitoring step, using the payment processing software component and the server to monitor any posting in venue-associated POS systems in respect of customer locations within associated venues and upon detection of the posting of any chargeable amounts in respect of a customer location, which is then an active location:
    i. generating and storing a one-time identifier to the location record corresponding to the active location; and
    ii. transmitting the generated one-time identifier to the identity target device associated with the active location;
  b. in a target-rendering step, on receipt of a transmission of a generated one-time identifier by identity target device, displaying said one-time identifier via the identity target device such that it is readable to mobile customer devices in proximity to the associated customer location;
  c. conducting transaction payments as desired to be completed by customers in respect of customer locations in sales venues using the server and the payment processing software component by, in respect of each transaction payment desired to be facilitated:
    i. receiving at the server a location transmission from a mobile customer device, said location transmission containing data corresponding to the readable one-time identifier displayed by the identity target device in respect of each active customer location in respect of which payment is desired to be processed, being the payment locations;
    ii. on receipt of a location transmission at the server, parsing the received location transmission to extract the one-time identifiers associated with each of the payment locations and the customer payment details;
    iii. selecting the location records from the location database corresponding to each payment location by matching the one-time identifiers extracted from the location transmission with the one-time identifiers stored in the individual location records;
    iv. using the selected location records, processing payment for the transaction by:
      1. conducting a query of the venue-associated POS system to identify the total payment amount required from the customer in respect of all of the payment locations;

2. triggering a payment transaction via the transaction gateway in the total payment amount using customer payment method details provided from the mobile customer device and the venue payment coordinates from the venue record associated with the payment locations;
v. on completion of the payment transaction:
1. transmitting a payment completion indication to the venue-associated POS system in respect of the payment locations; and
2. updating the location record for each payment location by removing the stored one-time identifier therefrom;

wherein the one-time identifiers do not correspond specifically to physical location details of the corresponding customer location and are not duplicated on any two location records; and wherein the one-time identifiers used in respect of location records and payment locations in a particular payment transaction are not reused in subsequent payment transactions by the server.

17. The system of claim 16 wherein the customer payment method details required to finalize a payment transaction are provided by the mobile customer device to the server within the location transmission.

18. The system of claim 16 wherein the customer payment details required to finalize a payment transaction are provided from the mobile customer device initiating the payment transaction in the course of a user interaction session with the server following the initiation of the payment sequence.

19. The system of claim 16 wherein the venue-associated POS systems push details of posted chargeable payment amounts to the server as they are posted to the POS systems and the monitoring step is conducted via a network listener receiving and processing such details at the server.

20. The system of claim 16 wherein the monitoring step is conducted by periodic polling of each venue-associated POS system by the server.

21. The system of claim 16 wherein the identity target devices and associated operating software listen to the network interface to receive transmissions of generated one-time identifiers to initiate the target-rendering step.

22. The system of claim 16 wherein the target-rendering step is conducted by periodic polling of the server and the location database with associated location records by each identity target device.

23. The system of claim 16 wherein the one-time identifier displayed by an identity target device in respect of an associated customer location will be read by pre-existing software on the mobile customer device, and the reading of the one-time identifier will result in the initiation of a location transmission to the server.

24. The system of claim 23 wherein the server is a web server, the one-time identifier contains a one-time web link and the pre-existing software comprises a reader capable of parsing the one-time identifier to extract the web link and open the parsed web link to initiate the location transmission and subsequent payment interaction between the customer and the server.

25. The system of claim 16 wherein the identity target devices comprise e-paper devices, mobile computer devices with video display, or freestanding video displays, each having the necessary controller and software thereon to enable network communication with the server along with the machine-readable visual display of one-time identifiers corresponding to associated customer locations.

26. The system of claim 16 wherein the identity target devices comprise short-range radio beacons with the necessary controller and software thereon to enable network communication with the server along with the machine-readable transmission of data corresponding to one-time identifiers corresponding to the associated customer locations.

27. A server for use in a method of processing payments for at least one location-based sales venue containing a plurality of customer locations and having a network-connected venue-associated POS system and a network-connected identity target device capable of dynamically displaying an one-time identifier readable by mobile customer devices associated and attached in proximity to each customer location, said server comprising:
a. a non-transient computer-readable storage medium having executable instructions, being a payment processing software component, embodied thereon;
b. one or more hardware processors configured to execute the instructions;
c. a network interface capable of communication via at least one data network with mobile customer devices as well as with all of the venue-associated POS systems and all of the identity target devices;
d. a transaction gateway through which customer payments can be processed; and
e. a location database comprising, for each sales venue:
i. a venue record containing venue payment coordinates via which payments to the venue can be electronically processed by the transaction gateway and network address details for the venue-associated POS system by which the server can communicate with same; and
ii. a location record corresponding to each physical customer location within the venue and containing venue-specific location details corresponding to a customer location defined within the venue-associated POS system, the network address details for the associated identity target device, and a one-time identifier associated with the location capable of display by the associated identity target device;

said server operable, using the payment processing software component, to:
a) in a monitoring step, monitor any posting in venue-associated POS systems in respect of customer locations within associated venues and upon detection of the posting of any chargeable amounts in respect of a customer location, which is then an active location, to:
a. generate and store a one-time identifier to the location record corresponding to the active location; and
b. transmit the generated one-time identifier to the identity target device associated with the active location;
b) conducting transaction payments as desired to be completed by customers in respect of customer locations in sales venues using the server and the payment processing software component by, in respect of each transaction payment desired to be facilitated:
a. receiving at the server a location transmission from a mobile customer device, said location transmission containing data corresponding to the readable one-time identifier displayed by the identity target device in respect of each active customer location in respect of which payment is desired to be processed, being the payment locations;
b. on receipt of a location transmission at the server, parsing the received location transmission to extract the one-time identifiers associated with each of the payment locations and the customer payment details;

c. selecting the location records from the location database corresponding to each payment location by matching the one-time identifiers extracted from the location transmission with the one-time identifiers stored in the individual location records;

d. using the selected location records, processing payment for the transaction by:
   i. conducting a query of the venue-associated POS system to identify the total payment amount required from the customer in respect of all of the payment locations;
   ii. triggering a payment transaction via the transaction gateway in the total payment amount using customer payment method details provided from the mobile customer device and the venue payment coordinates from the venue record associated with the payment locations; and e. on completion of the payment transaction:
   i. transmitting a payment completion indication to the venue-associated POS system in respect of the payment locations; and
   ii. updating the location record for each payment location by removing the stored one-time identifier therefrom;

wherein the one-time identifiers do not correspond specifically to physical location details of the corresponding customer location and are not duplicated on any two location records; and wherein the one-time identifiers used in respect of location records and payment locations in a particular payment transaction are not reused in subsequent payment transactions by the server.

28. The server of claim 27 wherein the customer payment method details required to finalize a payment transaction are provided by the mobile customer device to the server within the location transmission.

29. The server of claim 27 wherein the server will facilitate the capture of the customer payment details required to finalize a payment transaction from the mobile customer device initiating the payment transaction in a user interaction session with the initiating device following the initiation of the payment sequence.

30. The server of claim 27 wherein the monitoring step is conducted via a network listener receiving and processing such details at the server.

31. The server of claim 27 wherein the monitoring step is conducted by periodic polling of each venue-associated POS system by the server.

32. The server of claim 27 wherein the one-time identifier displayed by an identity target device in respect of an associated customer location will be read by pre-existing software on the mobile customer device, and the reading of the one-time identifier will result in the initiation of a location transmission to the server.

33. The server of claim 32 wherein the server is a web server, the one-time identifier contains a one-time web link and the pre-existing software comprises a reader capable of parsing the one-time identifier to extract the web link and open the parsed web link to initiate the location transmission and subsequent payment interaction between the customer and the server.

* * * * *